US012230934B2

(12) United States Patent
Saito

(10) Patent No.: US 12,230,934 B2
(45) Date of Patent: Feb. 18, 2025

(54) LASER OSCILLATOR

(71) Applicant: Hitachi, Ltd., Tokyo (JP)

(72) Inventor: Shinichi Saito, Tokyo (JP)

(73) Assignee: HITACHI, LTD., Tokyo (JP)

( * ) Notice: Subject to any disclaimer, the term of this patent is extended or adjusted under 35 U.S.C. 154(b) by 528 days.

(21) Appl. No.: 17/687,750

(22) Filed: Mar. 7, 2022

(65) Prior Publication Data

US 2023/0075435 A1     Mar. 9, 2023

(30) Foreign Application Priority Data

Aug. 24, 2021   (JP) ................................ 2021-136061

(51) Int. Cl.
*H01S 3/067*     (2006.01)
*G06N 10/40*     (2022.01)
*H01S 3/10*     (2006.01)

(52) U.S. Cl.
CPC ......... *H01S 3/06791* (2013.01); *G06N 10/40* (2022.01); *H01S 3/06716* (2013.01); *H01S 3/10061* (2013.01)

(58) Field of Classification Search
CPC ............. H01S 3/06791; H01S 3/06716; H01S 3/10061; G06N 10/40
See application file for complete search history.

(56) References Cited

U.S. PATENT DOCUMENTS

| 2016/0352515 | A1* | 12/2016 | Bunandar | ............. H04L 9/0852 |
| 2017/0024658 | A1 | 1/2017 | Utsunomiya et al. | |
| 2018/0246393 | A1 | 8/2018 | Inagaki et al. | |
| 2018/0268315 | A2* | 9/2018 | Utsunomiya | ........... G06E 3/005 |

FOREIGN PATENT DOCUMENTS

| JP | 2015-207032 A | 11/2015 |
| WO | 2015/156126 A1 | 10/2015 |
| WO | 2017/047666 A1 | 3/2017 |

OTHER PUBLICATIONS

Shinichi Saito, "Poincare Rotator for Vortexed Photons", Frontiers in Physics, vol. 9, Article 646228, Mar. 2021.

* cited by examiner

*Primary Examiner* — Yuanda Zhang
(74) *Attorney, Agent, or Firm* — MATTINGLY & MALUR, PC

(57) ABSTRACT

A macroscopic entanglement state in which a polarization state has a strong quantum correlation is realized by use of a macroscopic laser light. A laser oscillator includes a ring resonator having an optical fiber ring, an optical amplifier for maintaining an amplitude of a laser pulsed light propagating on the optical fiber ring, and three optical fibers that are connected with respective polarization controllers, and, after changing a polarization state of the laser pulsed light being a qubit extracted at a predetermined branch ratio from the optical fiber ring by the polarization controllers, couples the changed laser pulsed light whose polarization state has been changed with the laser pulsed light propagating on the optical fiber ring, and each polarization controller rotates the polarization state of the laser pulsed light with an S1 axis, an S2 axis, and an S3 axis, which are orthogonal to each other, as a rotation axis.

14 Claims, 20 Drawing Sheets

LASER OSCILLATOR

CROSS-REFERENCE TO RELATED APPLICATION

This application claims priority to Japanese Patent Application No. 2021-136061 filed on Aug. 24, 2021, the entire contents of which are incorporated by reference herein.

BACKGROUND OF THE INVENTION

The present invention relates to a laser oscillator, in particular, to a laser oscillator applicable to a photo quantum simulator or a macroscopic quantum entanglement generator.

Innovative advances in physics such as the quantum mechanics and the theory of relativity have dramatically improved science and technology in the 20th century. Among those physics, in the quantum mechanics, a particle nature of light, that is, the property as a photon, which is a basic elementary particle has been clarified from an extremely practical task of estimating a temperature from a color of light in a blast furnace in order to purify high-quality steel. Einstein, who has also contributed to the formation of such quantum mechanics, has established a theory of relativity and discerned the principle of the invariant of light velocity, in which the speed of light is unchanged regardless of an inertial system. As is well known, Einstein has not recognized the quantum mechanics as a complete theory, and has insisted that the quantum mechanics has fatal flaws. This is because when the quantum mechanics is applied to a two-particle system, a mysterious nature peculiar to the quantum mechanics called entanglement or quantum entanglement is deducted.

Two photons are taken up as an example. Photons can take two different states, called polarization or light spins. For example, there are a horizontal polarization and a vertical polarization. Those lights are also called orthogonal in quantum mechanical Hilbert space because the lights are completely different. The use of the vertical polarization and the horizontal polarization may be replaced with a state of clockwise circular polarization and a counterclockwise circular polarization. Further, the state of right diagonal polarization (called Diagonal polarization, D-polarization) and left diagonal polarization (anti-diagonal polarization, A-polarization) may be used. The general state is described as the superposition state of those different states (orthogonal states).

Now, it is assumed that there are two photons (a photon 1 and a photon 2). Each photon has a polarization state, for example, the photon 1 can be horizontally polarized, and the photon 2 can be vertically polarized, and conversely, the photon 1 can be vertically polarized, and the photon 2 can be horizontally polarized. When the quantum mechanics is applied, an overall superposition state of such a state can also be considered, and when the photon 1 is horizontally polarized, the photon 2 is vertically polarized, and when the photon 1 is vertically polarized, the photon 2 is horizontally polarized. In such a state, an observer cannot know the polarization state of either photon before observation. This is because the principle of quantum mechanics is that the state of both is the superposition state of the horizontal polarization and the vertical polarization, and that the observation results can only be known stochastically.

In such a state, it is assumed that the photon 1 and the photon 2 propagate far away from each other. A quantum mechanical correlation is maintained even if two photons are located apart from each other. Now, it is assumed that the polarization state of the photon 1 is observed. With observation, the photon 1 is determined to either vertically polarized or horizontally polarized. This is because that the orthogonal state can be taken only by one or the other. Although the photons are in the superposition state before observation, the photons are determined in one or the other state after observation, which is an important property, which is called the wave function collapse, although such a phenomenon is very strange. In this situation, if the state of the photon 1 is horizontally polarized, the state of the photon 2 is determined as vertical polarization without observation. This is because an original state is prepared so that the orthogonal state would tangle (become an entanglement state). Then, how does the photon 2 know that photon 1 has been observed as the horizontal polarization? Since the theory of relativity prohibits the transmission of information exceeding the light velocity in principle, the state of the photon 1 cannot be transmitted to the state of the photon 2 through information communication through some elementary particles (photons, electrons, etc.). Einstein has thought that the theory of relativity is more complete than quantum mechanics, so that such entanglement state shows clear theoretical flaws and is not expected to be realized in reality. However, the realization of the entanglement state has been experimentally verified afterwards, and the phenomenon of entanglement has been established academically now. That is, a hypothesis that the entanglement state contradicts the theory of relativity is wrong.

When a quantum correlation called entanglement has been established, even if two particles exist at a distance in space, since the two particles exist while maintaining a strongly correlated state, if the state of the photon 1 is established, the state of the photon 2 is determined instantaneously. However, since the wave function collapse occurs probabilistically, it cannot be determined in advance whether the photon becomes horizontal or longitudinal polarized. Therefore, information communication cannot be performed beyond the speed of light from an observer A observing the photon 1 to an observer B observing the photon 2. In other words, the quantum mechanics does not violate relativity.

With the establishment of quantum entanglement, the development of quantum information communication that can keep information secret and quantum computers boasting overwhelming computing power is accelerating by actively utilizing this strange property. Those new technologies are called quantum technologies. As a physical system for realizing quantum entanglement, there are a single photon or two-photon pair, a phase of a superconductor, a spin of a single electron, a single electron charge, an ion captured in an ion trap, an NV center that is a flaw in a diamond, and the like. Those physical systems are realized only in extreme conditions, such as requiring operation at cryogenic temperatures close to absolute zero, and a need to use superconducting nanowire detectors to detect a single photon with a weak intensity, and the physical systems are required to overcome a number of problems to be widely applied as engineering technology. Therefore, it is conceivable that practical universal quantum computers will be realized around 2050 at the earliest.

On the other hand, although not a universal quantum computer, many new operation methods different from conventional Neumann type computers have been devised. The reason why new computers have been devised is that the continuous development of semiconductor miniaturization technology using silicon, which is currently mainstream, is reaching a limit economically and technically. Silicon semiconductor technology has been developed year by year by scaling technology with small element size into practical use. Obviously, scaling cannot be continued for a long time due to the limitations of the material. For example, the finest structure in semiconductors is a gate insulating film, but the gate insulating film that is thin to 1.0 nm (five layers of atoms) in terms of oxide film thickness has already been put into practical use, and there is almost no change in the film thickness in transistors used in the past 10 years. In addition, there is a need to measure a performance improvement after suppressing a heat generation from a semiconductor chip to a practical calorific value, and it is difficult to hope for further rapid technological evolution. Therefore, new computational technologies inspired by the quantum computer have begun to appear though the computational technology have not been based on the performance improvement of the semiconductor, and have not provide a computational performance as the quantum computer.

In particular, a quantum annealing machine using superconductivity has been attracting attention. This is an early convergence of the operation results by realizing a superposition state of a digital state of 1 and 0 by use of superconductors when solving a physical mathematical model called the Ising model. With application of various real-world problems such as how to alleviate traffic congestion to the Ising model, the performance that surpasses the conventional classical computer has been achieved. However, since the quantum annealing machine operates at a cryogenic temperature, power consumption associated with its cooling is generated, so that there is a limit to practical application. Therefore, CMOS annealing, which solves the Ising model by using MOS (Complementary Metal-Oxide-Semiconductor) technology, which is the conventional semiconductor technology, has been devised, and makes it possible to handle a large number of bits as well as to operate at room temperature. Coherent Ising machines using light instead of electrons have also been devised.

Japanese Patent Application Laid-Open No. 2015-207032 discloses a method for representing a spin of the Ising model by a ring-type laser using a parametric oscillator. International Publication No. 2015/156126 also discloses a method for representing an interaction between spins by observing a phase representing a spin state represented by a laser light in a quantum operation of the Ising model. International Publication No. 2015/156126 discloses, in order to apply effective interactions, a method of observing the phase of bits and using an FPGA (Flexible Programmable Gate Array) circuit to control the interaction. International Publication No. 2017/047666 also discloses a method for converging to a desired state by optimizing a measurement method of the coherent Ising machine.

SUMMARY OF THE INVENTION

Although the development of new computers is progressing in this way, the Ising model is essentially a classical model, and the principle of quantum mechanical superposition is never essentially manifested. Specifically, the Ising model is a model for describing a virtual spin with a value only in a Z direction. In terms of digital bits, the easing model has either 1 or 0, and is exactly a classical state. When solving the Ising model with quantum annealing, an accelerated magnetic field is applied in an X or Y axis direction during convergence, and the virtual spins go through the superposition state of 1 and 0, and the operation result is derived earlier than usual, but the resulting spin state is either 1 or 0, and the superposition state is not realized as a final solution. In other words, no solution to the quantum model is reached by how the Ising model is solved, and there is no answer to the essence of the quantum problem. For instance, the easing model is insufficient to calculate the electronic state of a new medicine and chemical substance by the performance which surpasses a conventional classics computer though there are a lot of problems which can be solved even by the Ising model because many of the social problems of the reality are classic problems. Therefore, the development of a universal quantum computer is expected. However, since quantum entanglement is an extremely fragile state as described above, the quantum environment is barely observed only in a special environment, and it is extremely difficult to put the universal quantum computer into practical use in computing and communication. In order to develop quantum technology, it is desirable to realize a device that operates at room temperature, and generates a quantum entanglement state which easily enables observation and control.

The ability to easily observe and control the quantum entanglement means that a physical quantity configuring the quantum entanglement are not single photons, single electron spins, or ions. This is because controlling a single elementary particle is extremely difficult engineeringly even with current state-of-the-art technology. Therefore, it is desirable to use a macroscopic quantum state formed by a large number of elementary particles as a state forming the quantum entanglement. As the macroscopic quantum state that can be easily operated at room temperature, it is considered that polarization of laser light is used.

Shinichi Saito, "Poincaré Rotator for Vortexed Photons", Frontiers in Physics, Volume 9, Article 646228, March 2021 discloses a Poincaré rotator that controls a polarization state of laser light, which is a macroscopic quantum state. The Poincaré rotator can freely control any polarization state described by a Poincaré sphere and Stokes parameters. This means that any rotation operation can be performed by the Poincaré rotator with respect to a state represented as a vector on the Poincaré sphere. In this case, it is important that the Poincaré rotator can realize a desired rotation operation for any polarization state of the laser light. That is, no matter which direction the polarization state of an input laser light is facing as a vector on the Poincaré sphere, the desired rotation can be realized around a desired axis. For example, among the Stokes parameters $S_1$, $S_2$, and $S_3$, an $S_1$ axis is considered to be a Z axis, and a Poincaré rotator can be set so as to rotate 180° around the $S_1$ axis (Z axis). In this case, if the input is horizontally polarized, an output is converted to vertical polarization, and if the input is vertically polarized, the output is converted to horizontal polarization. In this way, in the Poincaré rotator, the desired rotation operation can be performed on the Poincaré sphere without observing the polarization state of the input laser light.

Based on the above result, the present inventors have examined the realization of a macroscopic quantum entanglement state. The realization of the macroscopic quantum entanglement states has not yet been reported. The macroscopic quantum entanglement state is defined as a state in which a macroscopic quantum state representing a qubit (for example, a polarization state) has a quantum correlation between multiple qubits.

As described above, since a communication exceeding the speed of light is prohibited in principle by the theory of relativity, it is not easy to artificially realize a macroscopic quantum entanglement state. As pointed out by Einstein, since a communication exceeding the speed of light cannot be realized, even if one qubit is observed and a state of the other qubit is changed according to a state of the observation result, that information cannot be conveyed. In the case of the coherent Ising machine disclosed in Japan Patent Application Laid-Open No. 2015-207032, International Publication No. 2015/156126, and International Publication No. 2017/047666, bit information is represented by a laser pulse. For the laser light propagating in an optical fiber, a propagation direction is one-dimensional, and the laser light propagates at the speed of light, and therefore a subsequent delay bit always lags behind the advanced bit moving forward. Therefore, even if the delay bit is observed and the information is sent to the advanced bit, a communication exceeding the speed of light cannot be performed, so that the information cannot be transmitted. In addition, when qubits are observed in the first place, the quantum state of the bits is determined according to the wave function collapse. Then, even if the spin state of a qubit 2 is turned downward with respect to the observation result that the spin state of a qubit 1 is upward, the spin state of the qubit 2 cannot be turned upward when the spin state of the qubit 1 is downward different from the observation result. Naturally, the opposite state cannot be created. In other words, if the state of the qubit has been observed as in those patent documents, the macroscopic quantum entanglement state cannot be realized by destroying the quantum state by wave function collapse.

Now, the inventor has reconsidered the problem of the present invention as realizing a ground state of the quantum Heisenberg model with a laser light. If the Ising model, which has only spins in the Z-axis direction, is extended to a true spin that can also be directed in the X-axis and the Y axis, a Heisenberg model is obtained. Some of the Heisenberg models, which that give a ferromagnetic state are known to be classical spins facing an easy axis, whereas the Heisenberg model containing antiferromagnetic interactions is called a quantum Heisenberg model, and a quantum mechanical state is essentially realized. For example, if there are two spins responsible for antiferromagnetic interactions, the ground state becomes a spin singlet. This is equivalent to the macroscopic quantum entanglement state.

The present invention provides a physical system in which an interaction described as a quantum Heisenberg model between two qubits works for a qubit (laser pulsed light) in which a macroscopic number of photons are coherently in the same polarization state, and realizes a macroscopic quantum entanglement state, which is the lowest state of energy among the states described in such interaction Hamiltonians.

As a result, a quantum simulator that realizes a low state of energy by applying a predetermined interaction between qubits can be realized. In addition, a macroscopic quantum entanglement generator that generates laser light, which is in a macroscopic quantum entanglement state can be provided so as to be able to provide a base for quantum computing and quantum communication, which can operate at room temperature and are controllable in ordinary optical technology.

A laser oscillator according to an embodiment of the present invention, includes: a ring resonator including an optical fiber ring in which an optical fiber is connected in a ring shape; an incident laser light control unit that enters a laser pulsed light as a qubit string on the ring resonator; a laser light detection unit that detects a polarization state of the laser pulsed light oscillating by the ring resonator; an optical amplifier that is connected to the optical fiber ring and maintains an amplitude of the laser pulsed light propagating through the optical fiber ring; a first optical fiber that is connected with a first polarization controller, after changing a polarization state of the laser pulsed light being a first qubit and a second qubit, which are continuous to each other and extracted from the optical fiber ring at a predetermined branch ratio, by the first polarization controller, and couples the laser pulsed light whose polarization state has been changed with the laser pulsed light being the first qubit and the second qubit, which are continuous to each other and propagate on the optical fiber ring; a second optical fiber that is connected with a second polarization controller, after changing a polarization state of the laser pulsed light being the first qubit and the second qubit, which are continuous to each other and extracted from the optical fiber ring at a predetermined branch ratio, by the second polarization controller, and couples the laser pulsed light whose polarization state has been changed with the laser pulsed light being the first qubit and the second qubit, which are continuous to each other and propagate on the optical fiber ring; and a third optical fiber that is connected with a third polarization controller, after changing a polarization state of the laser pulsed light being the first qubit and the second qubit, which are continuous to each other and extracted from the optical fiber ring at a predetermined branch ratio, by the third polarization controller, and couples the laser pulsed light whose polarization state has been changed with the laser pulsed light being the first qubit and the second qubit, which are continuous to each other and propagate on the optical fiber ring, in which the polarization state of the laser pulsed light is represented as a state vector in a Poincaré sphere having an $S_1$ axis, an $S_2$ axis, and an $S_3$ axis which are orthogonal to each other, the first polarization controller rotates the state vector representing the polarization state of the laser pulsed light as a rotation axis on the $S_1$ axis, the second polarization controller rotates the state vector representing the polarization state of the laser pulsed light as a rotation axis on the $S_2$ axis, and the third polarization controller rotates the state vector representing the polarization state of the laser pulsed light as a rotation axis on the $S_3$ axis.

According to the present invention, a macroscopic entanglement state in which a polarization state has a strong quantum correlation can be realized by use of a macroscopic laser light. This makes it possible to handle the quantum entanglement state by use of the laser light with the strong intensity. As a result, quantum simulators, quantum computers, quantum communication equipment, etc. that can operate at room temperature can be realized by use of optical components such as modulators, optical fibers, and photodiodes commonly used in an optical communication, and so on.

Other issues, configurations and effects are clarified by the description of the following embodiments.

DETAILED DESCRIPTION OF THE PREFERRED EMBODIMENTS

First, a basic concept of an interacting quantum spin system will be described. In order to physically understand quantum multibody problems including the quantum spin system, it is necessary to use a physical mathematical method for the interacting spin system. According to the Feynman's quantum multibody theory, in order to determine physical quantities such as quantum mechanical states, probability amplitudes, and expected values, the effects of any physically feasible state can be calculated and an integration (path integration) for any path that can be taken as a physical state. In order to achieve the method, mathematical details are not omitted, but a topological diagram called the Feynman diagram as shown in FIGS. 1A to 1F can be drawn and an integral operation corresponding to the drawn diagram can be performed.

Figure 1A:
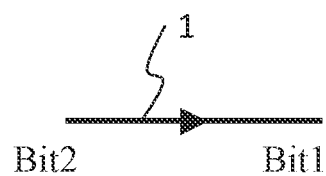
FIG. 1A is a Feynman diagram representing a propagation of a qubit 1 and a qubit 2 in space-time.
Figure 1B:
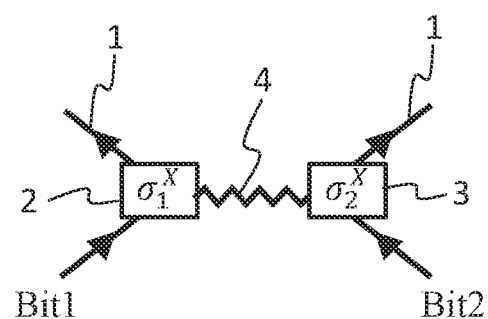
FIG. 1B Is a Feynman diagram representing an interaction by a Pauli operator X.
Figure 1C:
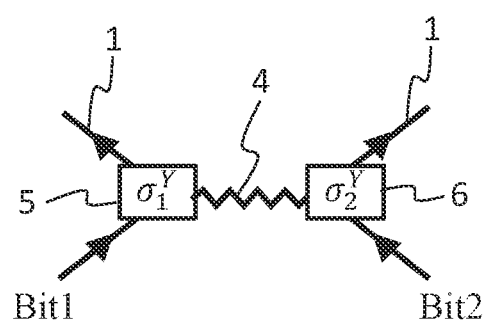
FIG. 1C is a Feynman diagram representing an interaction by a Pauli operator Y.
Figure 1D:
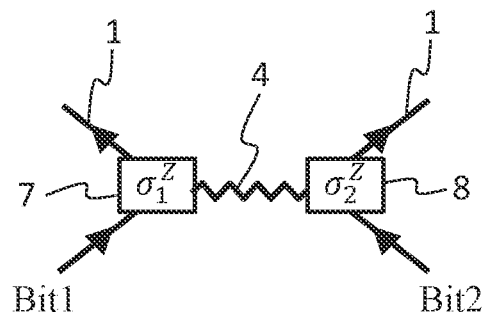
FIG. 1D is a Feynman diagram representing an interaction by a Pauli operator Z.

FIG. 1A illustrates a green function 1 representing a propagation of a qubit (quantum bit) 1 and a qubit (quantum bit) 2 in space-time. FIG. 1A shows that the qubit 2 follows the qubit 1, which is an advanced bit, and the interaction with time and spatial development is not expressed in a positive state. FIG. 1B shows how an interaction 4 is working between the qubit 1 and the qubit 2 as a result of an operation 2 by a Pauli operator X to the qubit 1 and an operation 3 by the Pauli operator X to the qubit 2. Similarly, FIG. 1C shows that the interaction 4 is working between the qubit 1 and the qubit 2 as a result of an operation 5 by a Pauli operator Y to the qubit 1 and an operation 6 by the Pauli operator Y to the qubit 2, and FIG. 1D shows that the interaction 4 is working between the qubit 1 and the qubit 2 as a result of an operation 7 by a Pauli operator Z to the qubit 1 and an operation 8 by the Pauli operator Z to the qubit 2.

Figure 1E:
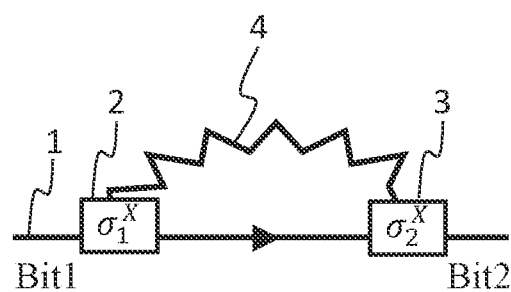
FIG. 1E is a Feynman diagram representing an exchange interaction.

The Feynman diagrams mean that drawing of such diagrams is equivalent to operation. For example, in order to calculate a green function (a function describing time evolution) containing an interaction, an exchange interaction illustrated in FIG. 1E and a direct interaction illustrated in FIG. 1F may be considered. Meanwhile, the exchange interaction illustrated in FIG. 1E shows that the operation 3 by the Pauli operator Y is applied to the result of the operation 2 by the Pauli operator X to the qubit 1, and output as the qubit 2.

Figure 2:
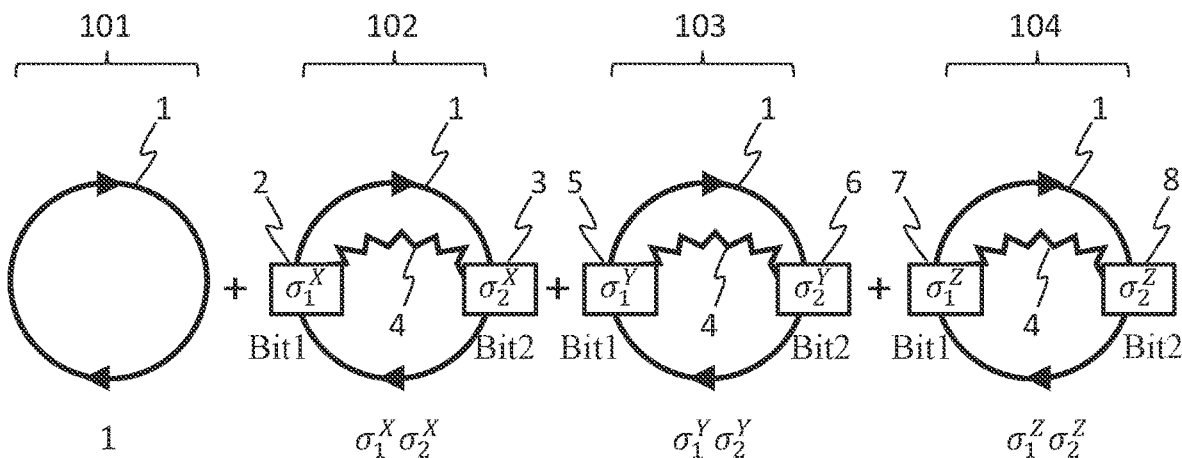
FIG. 2 is a Feynman diagram representing an XYZ quantum Heisenberg model in the case of 2 qubits.

One aspect of the present invention is to provide a machine that configures a physical system that can be described in a Feynman diagram for the qubits. The machine is named Feynman Machine. As an example, FIG. 2 shows a Feynman diagram for an XYZ quantum Heisenberg model (whose contents will be described later) in the case of 2 qubits. First, a leftmost state 101 corresponds to a state in which no interaction works at all, and the state is not changed. In this case, the operator works as an identity operator 1. In this example, it is important that the qubits are coupled in a ring shape. As a result, a distinction between an advanced bit (for example, qubit 1) that is advancing in time and a delay bit (for example, qubit 2) that are lagging behind in time can be eliminated. This is because if qubits are coupled in a ring shape, there is no meaning that which qubit is ahead.

Next, the Pauli operator X represented by (Ex. 1) is applied to both the bits of the qubit 1 and the qubit 2.

$$\sigma^X = \begin{pmatrix} 0 & 1 \\ 1 & 0 \end{pmatrix} \quad [\text{Ex. 1}]$$

A state 102 is described as a combination of the exchange interaction from the qubit 1 to the qubit 2 and the exchange interaction from the qubit 2 to the qubit 1. This is because the Heisenberg model is configured by a two-body interaction. For that reason, operators are applied continuously to the qubit 1 and the qubit 2. In addition, the above operation needs to be performed without observing the state of the qubit so as not to cause the wave function collapse. For that purpose, a Poincaré rotator disclosed in Shinichi Saito, "Poincaré Rotator for Vortexed Photons", Frontiers in Physics, Volume 9, Article 646228, March 2021, or a combination of a half-wave plate or a half-wave rotator with a phase modulator may be used. In this way, the state 102 in which the qubits interact with each other is superimposed on the original state 101, which is an identity operation without interaction.

In addition, a state 103 in which the Pauli operator Y represented by (Ex. 2) is applied to the qubit 1 and the qubit 2 is similarly superimposed.

$$\sigma^Y = \begin{pmatrix} 0 & -i \\ i & 0 \end{pmatrix} \quad \text{[Ex. 2]}$$

Furthermore, a state 104 in which the Pauli operator Z represented by (Ex. 3) is applied to the qubit 1 and the qubit 2 is similarly superimposed.

$$\sigma^Z = \begin{pmatrix} 1 & 0 \\ 0 & -1 \end{pmatrix} \quad \text{[Ex. 3]}$$

The Feynman Machine is a laser oscillator that realizes such a superposition state in a light polarization state and inserts into the ring laser resonator to cause laser oscillation. During laser oscillation, a polarization state with the lowest propagation loss is realized. This is described by the principle of the least action based on the Feynman's path integration. In other words, in the Feynman Machine, a phase of a quantum mechanical wave function for representing the polarization state is adjusted so that the possibility of realizing all kinds of polarization states is realized according to a prescription of the Feynman diagram (FIG. 2). At that time, as will be described later, the spins are adjusted so that an energy is lowered most when the spins are located antiferromagnetically in the X-axis direction, the Y-axis direction, and even the Z axis direction. A lowest state of the energy is a state where a macroscopic quantum entanglement called spin singlet is realized.

The Hamiltonian that the Feynman Machine in this example should solve is an XYZ quantum Heisenberg model represented by (Ex. 4). For simplicity, an example of two qubits will be described, but it is easy to extend to multi-qubits or to more complex interactions.

$$H = J_X \sigma_1^X \sigma_2^X + J_Y \sigma_1^Y \sigma_2^Y + J_Z \sigma_1^Z \sigma_2^Z \quad \text{Ex. 4}$$

In this example, $J_X$, $J_Y$, and $J_Z$ represent the magnitude of the spin interaction in the X, Y, and Z axes of spin, respectively. In this example, for simplicity, the case of $J_X = J_Y = J_Z = J > 0$ will be described. This corresponds to a low energy when the spin between the qubits is in an antiferromagnetic placement. The case of J<0 corresponds to a ferromagnetic state. In the ferromagnetic state, a classical state in which the spin is ferromagnetically oriented in a direction of an effective magnetic field created by an interacting adjacent spin becomes the lowest energy state, and spin frustration does not occur at all so that the lowest energy state is not an interesting state as a quantum state. Ferromagnetic coupling will also be considered when considering actual complex multibody interactions, but in order to simplify a description and focus on an essential discussion, antiferromagnetic coupling will be focused. The spin interaction can be calculated by use of the Feynman diagrams shown in FIGS. 1A to 1F.

Based on Feynman's idea of path integration, let us consider how the Heisenberg model (Ex. 4) evolves with time. Based on the basic principle of the quantum mechanics, the time evolution is described in (Ex. 5) using Hamiltonian.

$$\text{Exp}\left(-\frac{i}{\hbar}Ht\right) \approx 1 - J\frac{it}{\hbar}(\sigma_1^X \sigma_2^X + \sigma_1^Y \sigma_2^Y + \sigma_1^Z \sigma_2^Z) \quad \text{[Ex. 5]}$$

In this example, t is the time, i is an imaginary unit that satisfies $i^2 = -1$, and h-bar is a Dirac constant in which the Planck constant h is divided by $2\pi$. The operator is a Pauli operator indicated by (Ex. 1) to (Ex. 3), but has a subscript of "1" or "2" indicating the qubit. Subscript 1 means that only the qubit 1 is computed, and subscript 2 means that only the qubit 2 is computed. (Ex. 5) is the result of developing a factor of an exponential function to the first order in order to consider a state after the evolution of the minute time t according to the Feynman. This is an expansion formula widely known as the Suzuki-Trotter formula.

First of all, 1 is an identity factor to be important when considering the time evolution after the minute time from this formula. The quantum mechanics suggests that in the time evolution after the small time, the state does not change much from an original state. Therefore, it is important to maintain the original state and superimpose the original state with another state. Next, a suggestive element is an imaginary factor. Since the left side of (Ex. 5) has an imaginary i in an argument of an exponential function, a unitary operator of the time evolution does not change an amplitude, and its size is 1. This means that the time evolution is reversible. In other words, the quantum mechanical time evolution has time reversal symmetry if loss or gain is not generated. In considering such time evolution, if the identity operator is 1, the real value cannot be given any more. This is because the imaginary number is actually attached to the right side of (Ex. 5). Such an imaginary operation can be actually performed for the laser light. This can be understood from (Ex. 6).

$$-i = \text{Exp}\left(-i\frac{\pi}{2}\right) \quad \text{[Ex. 6]}$$

That is, (Ex. 5) can be calculated by performing an operation determined by the Pauli operator on the qubit divided and extracted from the qubit that holds the original state by applying an identity operator, and then rotating the phase by −90° determined by (Ex. 6) and combining those qubits. Therefore, the operation of (Ex. 5) can be physically realized. That is, J is determined by a branch ratio that branches the qubit, and can be adjusted by a decoupling ratio in a directional coupler. t is determined by the time to control an optical pulse string of the qubit.

By repeatedly executing such time evolution, the quantum state of an input light develops in time. In accordance with the Feynman's concept of path integration, when the quantum state of the input light matches the quantum state of the output light after performing an operation determined by (Ex. 5), the system becomes a unique state, or a stable state. However, in an actual experimental system, during such time evolution, various losses occur and the amplitude decreases. When the amplitude decreases, the input laser light will eventually decay and the intensity will be reduced. Therefore, an amplification (gain) medium is put in the ring resonator. Specifically, an Er-doped fiber amplifier (EDFA) or a semiconductor optical amplifier (SOA) is inserted into the ring oscillator. Then, each qubit is naturally selected so as to obtain an optimal spin placement with the lowest loss.

Due to repeated time evolution, the energy of the system becomes unique, but the lowest value is not necessarily chosen. However, as a quantum state, interest is usually focused on the lowest energy state. Then, imaginary time τ=it is introduced. This technique itself has been known as Wick rotation in theoretical and statistical physics, but its application to the physical system has not been used. By applying the Wick rotation to (Ex. 5), (Ex. 7) can be obtained.

$$1-\beta J(\sigma_1^X\sigma_2^X+\sigma_1^Y\sigma_2^Y+\sigma_1^Z\sigma_2^Z)\approx \text{Exp}(-\beta H)$$

$$\beta=\tau/\hbar=it/\phi \quad \text{Ex. 7}$$

(Ex. 7) corresponds to a phase operation of (Ex. 5) that is replaced with an amplitude operation. That is, with the Wick rotation, the state with the lowest energy gives the maximum amplitude. Such Wick rotation may rotate the phase 180° instead of turning the phase by −90° according to (Ex. 6) during coupling. This can be understood from a sign of the phase factor of (Ex. 7) and (Ex. 8).

$$-1=\text{Exp}(i\pi) \quad \text{Ex. 8}$$

This means adjusting a phase of half wavelength λ/2 with a wavelength as λ. Such precise phase control can be easily achieved with current optical technology. It is important to note that the quantum state is represented as a direct product of two qubits such as (Ex. 9), and the phase factor of −1 is the phase of the multibody state as a whole.

$$|\text{Bit1}\rangle \otimes |\text{Bit2}\rangle = |\text{Bit1}\rangle |\text{Bit2}\rangle \quad \text{Ex. 9}$$

Since $-1=i^2$ is met, the phase may be rotated by 90° each to couple those qubits. Alternatively, instead of rotating the phase equally to the two qubits, the phase may be rotated 180° to give a phase factor of −1 for the qubit 1, and for the qubit 2, the qubits may be coupled for the qubit 2 without rotating the phase. In this example, the case of the antiferromagnetic coupling, which is inherently important, is described, but in order to realize the ferromagnetic coupling, since +1=i (−i) is met, the phase may be rotated 90° for the qubit 1, and the phase may be rotated by −90° for the qubit 2 to couple those qubits. This indicates that not only a local phase but also a global phase going through the entire ring resonator is important, and whether those phases can be coherently matched as an entire wave function in a multibody state is important in generating ring laser oscillation.

As described above, the Antiferromagnetic Heisenberg model can be physically realized by the Feynman Machine. The physical meaning of the above realization will be described. The antiferromagnetic Heisenberg model of two qubits is represented by (Ex. 10).

$$H = J\begin{pmatrix} 1 & 0 & 0 & 0 \\ 0 & -1 & 2 & 0 \\ 0 & 2 & -1 & 0 \\ 0 & 0 & 0 & 1 \end{pmatrix} \quad \text{[Ex. 10]}$$

In this example, the state of 2 qubits has four states of |↑, ↑>, |↑, ↓>, |↓, ↑>, and |↓, ↓>. When this Hamiltonian is diagonalized, (Ex. 11) is obtained.

$$H = J\begin{pmatrix} 1 & 0 & 0 & 0 \\ 0 & 1 & 0 & 0 \\ 0 & 0 & 1 & 0 \\ 0 & 0 & 0 & -3 \end{pmatrix} \quad \text{[Ex. 11]}$$

In this example, the wave function that gives a −3J state with the lowest energy is a spin singlet represented by (Ex. 12).

$$|\text{Singlet}\rangle = \frac{1}{\sqrt{2}}(|\uparrow, \downarrow\rangle - |\downarrow, \uparrow\rangle) \quad \text{[Ex. 12]}$$

Note that the state of each qubit is described by polarization, and the state represented by (Ex. 12) is entangled by the polarization of the different qubits. A coherent laser light has a macroscopic number of photons in the same polarization state. The fact that tangles are also achieved between the polarizations of the qubits configured by optical pulses means that macroscopic entanglement is realized. In other words, with the utilization of a laser technology, an entanglement state that can be easily controlled at room temperature can be realized so that quantum computers can be realized easily, and can be widely applied to a quantum simulation and a quantum cryptographic communication.

Hereinafter, the embodiments of the present invention will be described with reference to the accompanying drawings. Those examples are only examples, and various modifications such as a material used, a conductive type, and a shape can be performed. In addition, device structures described in each example can be combined or replaced with each other. In addition, in order to facilitate understanding in the drawings, important parts are enlarged and illustrated, so that an illustration scale is different from the actual scale.

In the following example, an example in which the polarization state of the laser light is represented as a state vector having a base with a Stokes parameter $S_1$ as a Z axis, a Stokes parameter $S_2$ as an X axis, and a Stokes parameter $S_3$ as a Y axis. In this case, a horizontal polarization and a vertical polarization are in a base state. The method of taking the base is not limited the above example, and for example, when the base is taken with the Stokes parameter $S_3$ as the Z axis, the Stokes parameter $S_1$ as the X axis, and the Stokes parameter $S_2$ as the Y axis, a circular polarization becomes the base state.

Example 1

A Feynman Machine according to Example 1 controls a polarization state of a pulsed light partially extracted from a ring resonator by using a directional coupler, and returns the pulsed light to the ring resonator, so that a phase and an amplitude of a wave function are changed little by little to realize an interaction shown in a Feynman diagram.

Figure 4A:
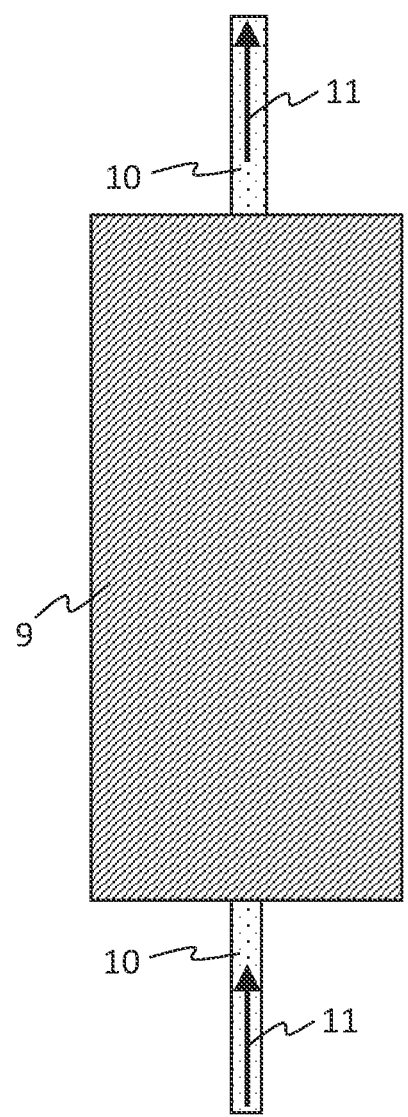
FIG. 4A shows a Poincaré rotator.

First, a Poincaré rotator (polarization controller) 9 frequently used in this example will be described. As schematically shown in FIG. 4A, the Poincaré rotator 9 is connected to a single-mode optical fiber 10 and changes a polarization state of a photon qubit 11 propagating in the single-mode optical fiber 10. The polarization state can be represented by a vector directed from a center of a Poincaré sphere toward a spherical surface, and the Poincaré rotator 9 can rotate a vector state at any angle around any rotation axis.

Figure 4B:
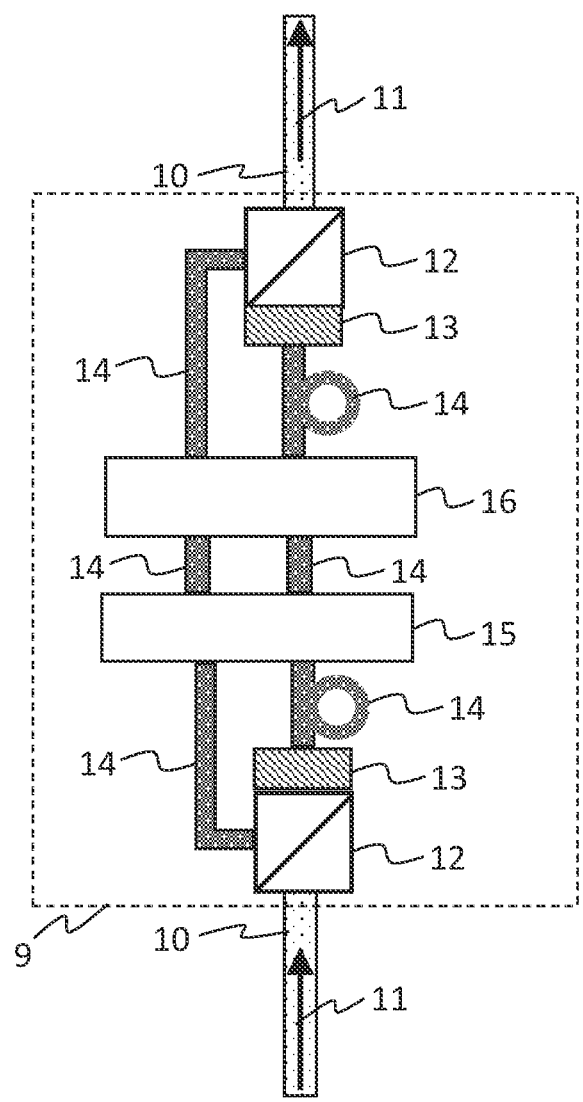
FIG. 4B shows a configuration example of the Poincaré rotator.

One of specific configuration examples of the Poincaré rotator 9 is shown in FIG. 4B. The photon qubit 11 incident through the single-mode optical fiber 10 is first separated into a horizontal polarization state |H> and a vertical polarization state |V> by polarization beam splitters (PBS) 12. In this example, a beam splitter using a spatial optical system is used, but polarization components may be separated by a two-dimensional grating coupler using silicon photonics. The polarization components separated by the polarization beam splitter (or polarization beam coupler) 12 is input to each of polarization-maintaining and absorption-reducing (PANDA) optical fibers 14. At that time, in order to orient a narrow key to a slow axis of the polarization-maintaining and absorption-reducing optical fibers 14, the polarization beam splitter 12 is coupled to the polarization-maintaining and absorption-reducing optical fiber 14 through a half-wave plate 13 in which a fast axis is aligned in a horizontal direction with respect to the horizontal polarization state |H>. When a single-mode thin wire waveguide in only a TE (Transverse-Electric) mode is used with silicon photonics, there is no TM (Transverse-Magnetic) mode, and the polarization components propagate on the silicon thin line waveguide as the TE mode in both modes. Therefore, the half-wave plate 13 is not required. An optical path length of the polarization-maintaining and absorption-reducing optical fibers 14 for the horizontal polarization state |H> is adjusted to be the same as an optical path length of the polarization-maintaining and absorption-reducing optical fibers 14 for the vertical polarization state |V>. Both the polarization components are incident on an optical rotator 15. The optical rotator 15 is configured by a Mach-Zehnder interferometer, a phase regulator, a multi-mode interferometer (MMI), and a waveguide, and can adjust an amplitude ratio between the horizontal polarization state |H> and the vertical polarization state |V>. This corresponds to rotating the polarization state of a laser light around the $S_3$ axis of the Poincaré sphere. The phase modulator in the optical rotator 15 allows a modulation amount to be electrically controlled so that an arbitrary rotation angle can be controlled electrically freely.

The polarization component that has passed through the optical rotator 15 is incident on an optical modulator array 16 through the polarization-maintaining and absorption-reducing optical fiber 14, and each phase of the horizontal polarization state |H> and the vertical polarization state |V> is adjusted. The optical modulator array 16 is electrically connected and can electrically rotate the phase of the polarization state at any angle. The polarization state of the laser light is rotated around the $S_1$ axis or the $S_2$ axis of the Poincaré sphere due to a phase difference given to the horizontal polarization state |H> and the vertical polarization state |V>.

The polarization-maintaining and absorption-reducing optical fiber 14 for the horizontal polarization state |H> is coupled to the polarization beam coupler 12 through the half-wave plate 13, and returns the polarized light oriented to the slow axis to the original horizontal polarization state |H> by rotating the polarization state, and makes the polarized light incident on the polarization beam coupler 12. The polarized light for the vertical polarization state |V> is incident on the polarization beam coupler 12 as it is. An optical path length of the polarization-maintaining and absorption-reducing optical fibers 14 for the horizontal polarization state |H> is adjusted to be the same as an optical path length of the polarization-maintaining and absorption-reducing optical fibers 14 for the vertical polarization state |V>. The photon qubit 11 thus coupled again is output from the single-mode optical fiber 10.

The transmission of a desired laser light through an optical element in the Poincaré rotator 9 corresponds to a quantum mechanical operation that changes the polarization state. When the laser light has transmitted through the optical element, the phase or amplitude representing the polarization state change, and this change corresponds to the rotation of the state vector representing the polarization state on the Poincaré sphere. As described above, the Poincaré rotator 9 is an ideal device that can rotate a desired angle around a desired axis on the Poincaré sphere without observing the polarization state of the incident light.

Figure 5:
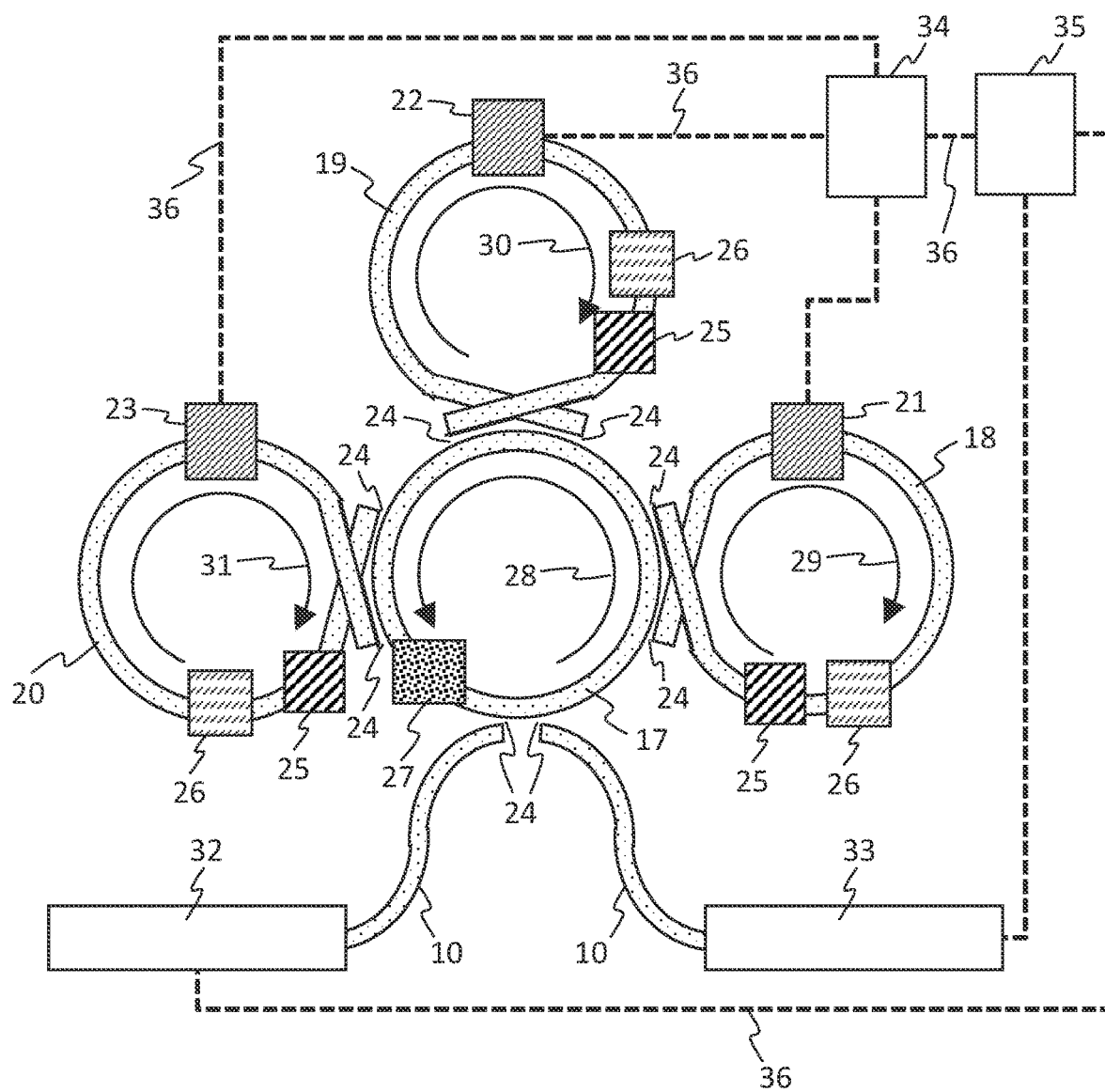
FIG. 5 shows a Feynman Machine of Example 1.

FIG. 5 shows a schematic diagram of the Feynman Machine in Example 1. There are several important components that will be described step by step. First, a single-mode optical fiber ring 17 that functions as a ring resonator is present at the center of the Feynman Machine. A qubit sequence converges to an optimum spin placement by repeatedly rotating in the single-mode optical fiber ring 17. Since the single-mode optical fiber ring 17 is of a ring shape, there is no distinction between advanced bits and delay bits, and a quantum correlation is achieved without violating causality as described above.

In order to apply an interaction, the single-mode optical fiber ring 17 is connected to an optical fiber 18 for applying an X-axis interaction, an optical fiber 19 for applying a Y-axis interaction, and an optical fiber 20 for applying a Z-axis interaction. A directional coupler 24 is used for the connection between those optical fibers 18, 19, and 20 for applying the interaction and the optical fiber ring 17. The directional coupler 24 is an element that enables the laser light to jump from one fiber to the other fiber by placing two optical fibers in close proximity. The directional coupler 24 is adjusted to be coupled at a desired branch ratio. For example, 10% of light is designed to be coupled to the interaction application optical fibers 18, 19, and 20.

The interaction application optical fibers 18, 19, and 20 are connected with an X-axis interaction application Poincaré rotator 21 that rotates the polarization state of the laser light around the X axis ($S_2$ axis), a Y-axis interaction application Poincaré rotator 22 that rotates the polarization state of the laser light around the Y axis ($S_3$ axis), and a Z-axis interaction application Poincaré rotator 23 that rotates the polarization state of the laser light around the Z axis ($S_1$ axis), respectively, and a desired interaction is applied between the qubit 1 and the qubit 2. The interaction application optical fibers 18, 19, and 20 are adjusted so that the respective optical path lengths are the same, but since the optical path length needs to be matched with an accuracy below the wavelength, a phase modulator 26 is provided in each ring. Further, in order to adjust the polarization axis of the optical fiber, a polarization regulator 25 is provided in each ring. Although the Poincaré rotator 9 may be naturally used for the polarization regulator 25, since the polarization regulator 25 does not need to be controlled at high speed, a less expensive type of polarization regulator that gives distortion to the optical fiber may be used.

The single-mode optical fiber ring 17 is connected with an erbium doped optical amplifier (EDFA) 27 to ensure that the amplitude of the input light is not attenuated. When the ring resonator oscillates in laser, a spin orientation with the lowest propagation loss is naturally selectively selected.

In the example of FIG. 5, a ring resonator propagation direction 28 is counterclockwise from the above of the paper. On the other hand, an X-axis optical fiber propagation direction 29, a Y-axis optical fiber propagation direction 30, and a Z-axis optical fiber propagation direction 31 are clockwise. In this example, since the optical fibers 18, 19, and 20 that apply the interaction are all circumferential with the same length as the circumference of the single-mode optical fiber ring 17, the light of the qubit extracted for the interaction returns to the same qubit, that is, the qubit 1 returns to the same qubit 1 after the phase of the qubit 1 is adjusted, and the qubit 2 returns to the same qubit 2 after the phase of the qubit 2 is adjusted. This corresponds to a condition where a state in which the identity operator 1 not subjected to the spin operation is performed and a state in which the spin operation is performed between the two qubits, are coupled by the desired phase, as shown in (Ex. 7).

In order to precisely control the phase in this way, it is important that the wavelength of the laser light propagating on the optical fiber ring 17 is accurately determined. Since the erbium doped optical amplifier (EDFA) 27 also generates naturally emitted light, the ring laser can oscillate without the input of the laser light. In this case, an oscillation wavelength of the ring resonator has the lowest propagation loss, and a wavelength at which the maximum gain can be obtained is selected, and a correct operation is not performed. In order to avoid the oscillation wavelength of the ring resonator from deviating from the design wavelength, it is desirable to input the laser light from the incident laser light control unit 32 in which the oscillation frequency is precisely locked into the single-mode optical fiber ring 17. Furthermore, a laser light detection unit 33 is connected to the single-mode optical fiber ring 17 to investigate the polarization state of the laser-oscillated laser.

In the quantum Heisenberg model, in order to apply the desired interaction between arbitrary qubits, a waveform generator 34 that is controlled by a control computer 35 and generates an arbitrary waveform is connected to the Poincaré rotator 9 through electric cables 36. A signal from the waveform generator 34 is used to adjust the amplitude or phase by the Poincaré rotator 9. As a result, the interaction between the various qubits can be controlled by the control computer 35.

Figure 6:
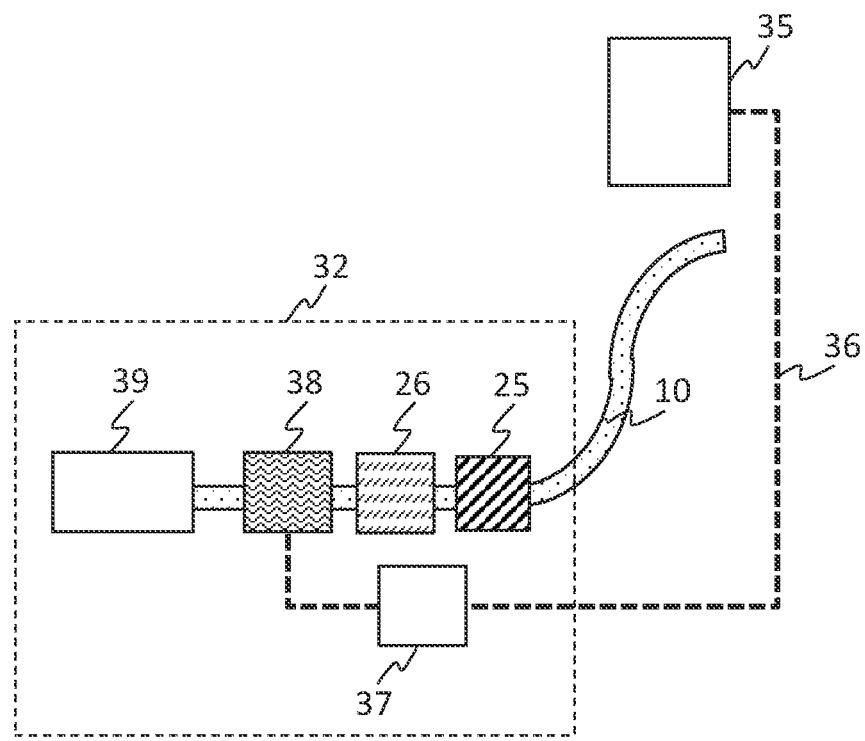
FIG. 6 shows a configuration example of an incident laser light control unit.

The details of the incident laser light control unit 32 are shown in FIG. 6. The control computer 35 is connected to a driver circuit 37 and drives an optical modulator 38. A laser light source 39 whose frequency is precisely locked is used. For example, a light source stabilized with a wavelength of 1532.8323 nm by a DFB (Distributed FeedBack) laser that locks the frequency with respect to acetylene molecular transition is used. The optical modulator 38 generates a laser pulsed light that is a qubit sequence. The waveform is extremely important for the laser light to function as a qubit sequence. This is because there is a need to have a part with a small amplitude so that a wave function representing the polarization state of the qubit can freely change its phase. This is similar to, for example, a superconducting Josephson junction, where a phase change can be performed by daringly forming a portion with a smaller amplitude called an order parameter. When a laser light is used, a portion with a small amplitude of laser light is intentionally formed between the qubit and the qubit. It is also important that there are some overlaps in the wave function between qubits, i.e., amplitudes. This overlap causes the phases of the two qubits to correlate, leading to the selection of the desired spin placement.

Figure 7:
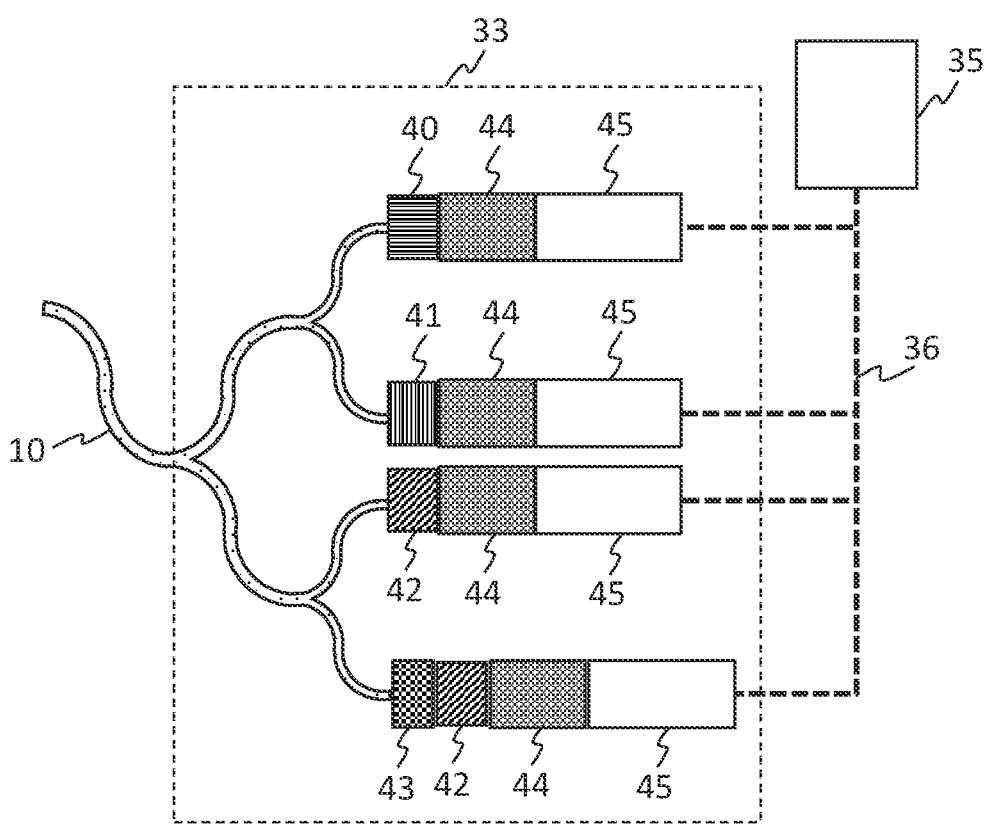
FIG. 7 shows a configuration example of a laser light detection unit.

The details of the laser light detection unit 33 are shown in FIG. 7. The system for detecting the polarization state is called a polarimeter, and the laser light detection unit 33 shown in FIG. 7 is an example of the polarimeter. An output laser light is branched equally to four waves and separates into their respective components through an X-axis polarizing plate 40, a Y-axis polarizing plate 41, and a D-axis (Diagonal, diagonally 45°) polarizing plate 42. In order to detect a circular polarization component, a quarter wave plate (QWP) 43 aligned with the fast axis on the A axis (obliquely −45°) is also disposed in front of the D-axis polarizing plate 42. The intensity of each component is detected by a photodiode 44, and a current signal generated in the photodiode is converted into a voltage with a transimpedance amplifier (TIA) 45 and analyzed by the control computer 35. An X polarization intensity, a D-polarization intensity, a Y polarization intensity, and a QWP-D polarization intensity thus detected are represented by (Ex. 13) to (Ex. 16), respectively.

$$I_X = \tfrac{1}{2}(S_0 + S_1) \qquad \text{Ex. 13}$$

$$I_D = \tfrac{1}{2}(S_0 - S_1) \qquad \text{Ex. 14}$$

$$I_Y = \tfrac{1}{2}(S_0 - S_1) \qquad \text{Ex. 15}$$

$$I_D^{QWP} = \tfrac{1}{2}(S_0 + S_3) \qquad \text{Ex. 16}$$

In this example, $S_0$ represents the intensity of the Stokes parameter, and $S_0$ of a perfect coherent light is represented by (Ex. 17), and represents a radius of the Poincaré sphere. The stokes parameters $S_1$, $S_2$, and $S_3$ represent expected values of each axis component of the light spin called polarization.

$$S_0 = \sqrt{(S_1)^2 + (S_2)^2 + (S_3)^2} \qquad \text{Ex. 17}$$

The Stokes parameter is obtained as (Ex. 18) to (Ex. 21) from the observations (Ex. 13) to (Ex. 16). As a result, the Stokes parameter, which is the spin expected value, can be detected.

$$S_0 = I_X + I_Y \qquad \text{Ex. 18}$$

$$S_1 = I_X - I_Y \qquad \text{Ex. 19}$$

$$S_2 = 2I_D - (I_X + I_Y) \qquad \text{Ex. 20}$$

$$S_3 = 2I_D^{QWP} - (I_X + I_Y) \qquad \text{Ex. 21}$$

Figure 8:
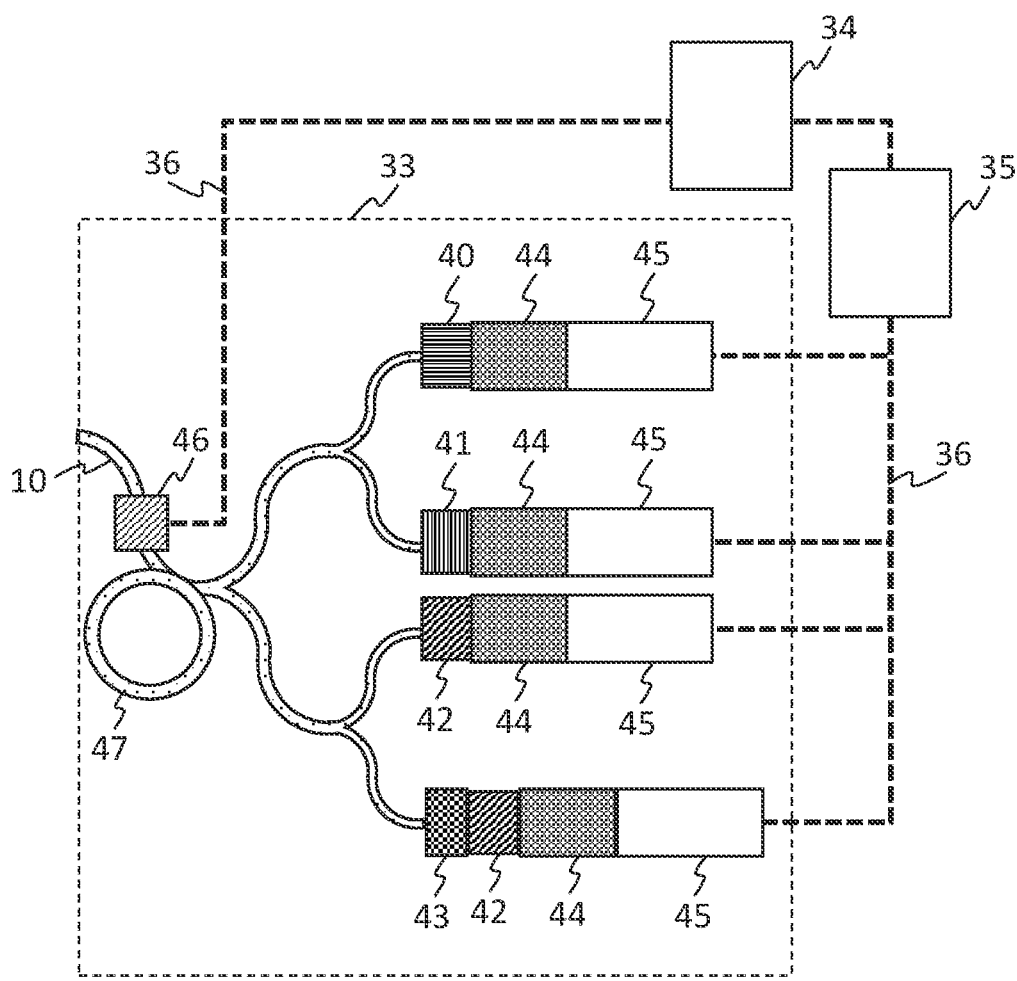
FIG. 8 shows a configuration example of a laser light detection unit for determining a green function.

Since Feynman Machine can realize a non-local quantum correlation, it is possible to directly observe not only the local spin expected value but also a green function representing the quantum correlation itself. A configuration example of the laser light detection unit 33 for achieving the above observation is shown in FIG. 8. Differences from FIG. 7 reside in that there are provided a detector Poincaré rotator 46 that performs a predetermined spin rotation operation, for example, on the qubit i, and a delay line 47 for generating an interaction with the spin rotation operation applied to the qubit i in the qubit j. The detector Poincaré rotator 46 is connected to the control computer 35, performs a desired spin operation on the qubit, and has a built-in filter so as to extract a necessary polarization component. In the laser light detection unit 33 shown in FIG. 8, operation is performed on the qubit i, and how the observation result of the qubit j changes according to the operation on the qubit i is observed. With the use of the laser light detection unit 33, the green function represented by (Ex. 22) can be directly observed.

$$G_{ij}^{\alpha\beta} = \langle \sigma_i^\alpha \sigma_j^\beta \rangle \qquad \text{Ex. 22}$$

In this example, $\alpha$ and $\beta$ are one of X, Y, and Z, respectively, and represent the direction of a spin orientation.

In the Feynman Machine of this example, when an antiferromagnetic bond is applied only in the $S_1$ direction as the Z axis of the spin with respect to the pulsed light of two qubits, the Feynman Machine operates as the Ising model. This can be confirmed by the laser light detection unit 33 of FIG. 7, for example, since the qubit 1 is determined as the horizontal polarization ($S_1 = 1$) and the qubit 2 is determined as the vertical polarization ($S_1 = -1$), while a D-polarization (Diagonal), the A-polarization (Anti-diagonal), an L polarization (left circular polarization), and an R polarization (right circular polarization) are not observed, and $S_2=S_3=0$ is satisfied.

In the Feynman Machine of this example, a quantum Heisenberg model is realized by applying an antiferromagnetic coupling in any of the X axis, the Y axis, or the Z axis. In this case, the local spin expected value measured by the laser light detection unit 33 of FIG. 7 is zero in either direction. This means that the spin is in a singlet state and is a quantum superposition state that is not specifically oriented to either axis. In this case, when the macroscopic entanglement state is examined by the laser light detection unit 33 that detects the green function shown in FIG. 8, when the polarization state of the qubit 1 is horizontally polarized, it is confirmed that the polarization state of the qubit 2 is vertical polarization. Further, when the polarization state of the qubit 1 is the vertical polarization, it is confirmed that the polarization state of the qubit 2 is the horizontal polarization. Similarly, when the polarization state of the qubit 1 is the D-polarization, the polarization state of the qubit 2 is the A-polarization, and when the polarization state of the qubit 1 is the A-polarization, it can be confirmed that the polarization state of the qubit 2 is the D-polarization. Similarly, when the polarization state of the qubit 1 is left circular polarization, the polarization state of the qubit 2 is a right circular polarization, and when the polarization state of the qubit 1 is the right circular polarization, it can be confirmed that the polarization state of the qubit 2 is a left circular polarization. As described above, in the entanglement state, since the antiferromagnetic coupling is performed in the direction of the X axis, the Y axis, and the Z axis, the state of the qubit 2 is determined by what operation is performed on the qubit 1.

Example 2

In Example 1, in order to obey the causality that Einstein has been concerned about, the distinction between advanced bits and delay bits is eliminated by using the ring resonator, and the quantum state having a coherent phase is selectively realized by using the oscillation of the laser light by the vertical mode. This shall be called a reincarnation method as a nickname. In the reincarnation method, there is an advantage that the optimal spin state can be obtained by appropriately rotating the phase with the Pauli operator. On the other hand, since the phase between the qubits needs to be precisely controlled, there is a problem that the sensitivity to a temperature change and a distortion from the external world affecting optical fibers is high.

Figure 1F:
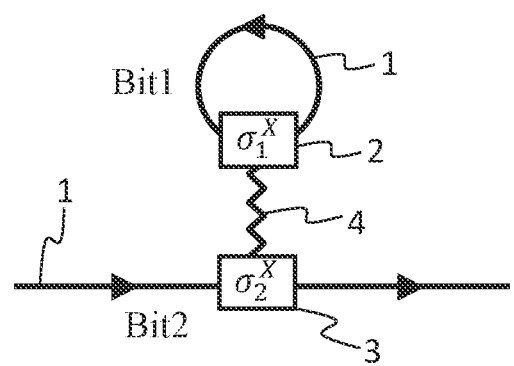
FIG. 1F is a Feynman diagram representing a direct interaction.
Figure 3A:
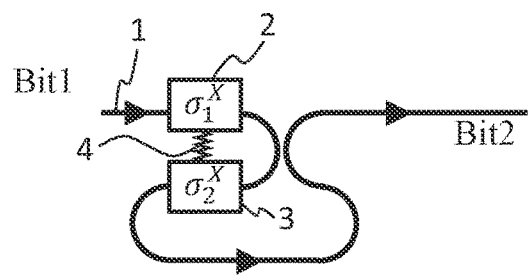
FIG. 3A is a Feynman diagram representing an exchange interaction.
Figure 3B:
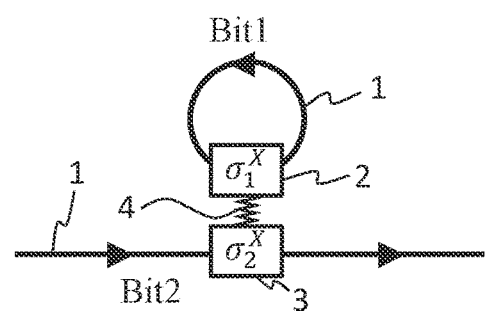
FIG. 3B is a Feynman diagram representing a direct interaction.

Example 2 is configured to overcome the high sensitivity to the environment in Example 1. In order to correlate between the advanced qubits propagating earlier and the delayed qubits that propagate late, Example 2 brings two qubits to the same space-time. The above state is shown by the Feynman diagram in FIGS. 3A and B. FIG. 3A is topologically identical to FIG. 1E representing the exchange interaction, and FIG. 3B is topologically identical to FIG. 1F representing the direct interaction. That is, FIGS. 3A and 1E, or FIGS. 3B and 1F represent the same interaction. The difference between those drawings resides in a distance of the interaction 4, and FIGS. 3A and 3B finitely illustrate the distance of the interaction 4 for the convenience of the drawing, but in fact, in order to bring the qubits to the same time and space, a propagation distance of a wavy line describing the interaction 4 is zero. However, for photons propagating in the optical fiber, the optical fiber is a one-dimensional space. The delay bit can never catch up with the advanced bit only by propagating the one-dimensional space. This is strictly proven by Einstein's theory of relativity. However, the optical fiber is placed in a real three-dimensional space, and propagation loss hardly occurs even if the optical fiber is gently bent. Therefore, the optical fiber is bent around like a ring so that the advanced bit can be brought to the same time and space as the delay bit. This is called a space-time warp method as a nickname. In this example, a part of the laser pulsed light forming two qubits is extracted from the laser pulsed light by a directional coupler, and a polarization state is interacted without observing the laser light by interfering with each phase representing the polarization state.

In Example 2, a configuration example of the Feynman Machine will be described which realizes an interaction between qubits based on the space-time warp method by realizing a polarization interferometer in which an advanced qubit and a delay qubit interfere with each other by a delay line.

Figure 9:
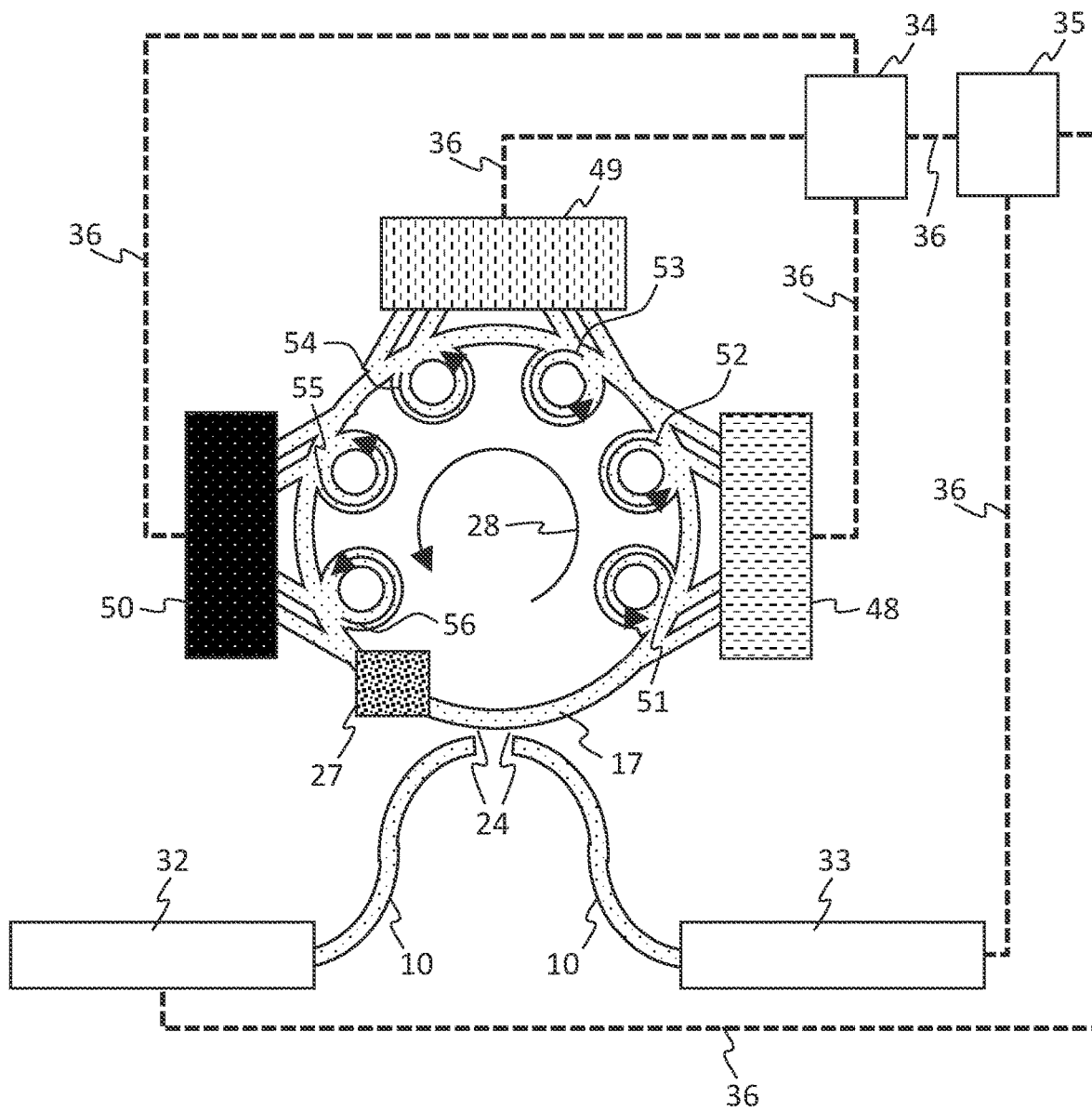
FIG. 9 shows a Feynman Machine of Examples 2 and 3.

FIG. 9 shows a schematic diagram of the Feynman Machine in Example 2. The basic principle that a single-mode optical fiber ring 17 is connected to an erbium doped optical amplifier 27, and a qubit sequence propagating the ring resonator oscillates in laser in an optimal spin placement that minimizes a propagation loss is the same as in Example 1. An important difference resides in a method of applying an interaction. In order to interact the advanced qubit and the delay bit in the same time and space, an effective delay line is formed by locally bending the single-mode optical fiber ring 17. Specifically, a delay line 51 for X axis input and a delay line 52 for X axis output are connected to an X-axis polarization interferometer 48, a delay line 53 for Y-axis input and a delay line 54 for Y-axis output are connected to a Y-axis polarization interferometer 49, and a delay line for Z-axis input 55 and a delay line 56 for Z-axis output are connected to a Z-axis polarization interferometer 50. A length of the delay lines 51 to 56 is determined according to the delay amount of the delay qubit with respect to the advanced qubit in the single-mode optical fiber ring 17, and for example, when the advanced qubit and the delay qubit are continuous, the length of the delay lines 51 to 56 are set to a length of one bit of the qubit. The advanced qubit is delayed and input into the polarization interferometer at the same time as the delay qubit so that the advanced qubit can interact with the delay qubit. In addition, since the polarization interferometer outputs the advanced qubit and the delay qubit interacting with each other at the same time, the delay qubit (the interacting component of the delay qubit) is delayed so that the interacting components of the advanced qubit are coupled with the non-interacting components of the advanced qubit, and the interacting components of delayed qubits are coupled with the non-interacting components of the delay qubit.

Figure 12A:
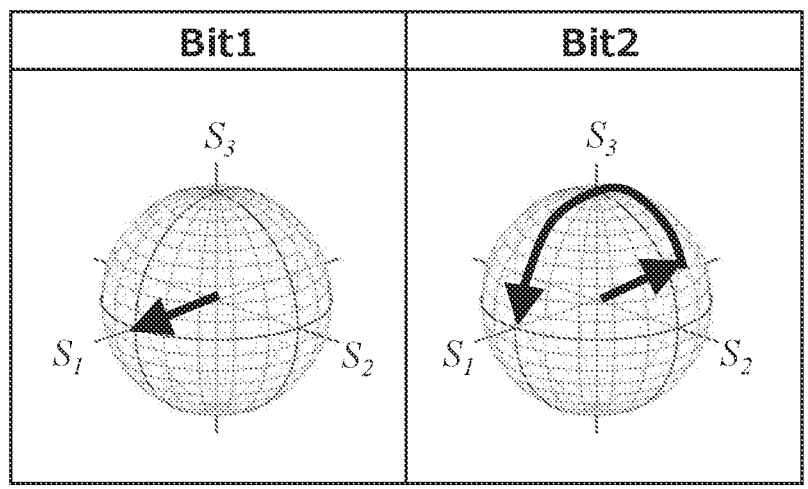
FIG. 12A is a diagram illustrating a principle of the polarization interferometer.

Before describing the details of the interaction, how to configure a polarization interferometer will be described with a Poincaré sphere. In this example, the Z-axis polarization interferometer 50 will be described as an example, but the same applies to other axes. A qubit pair including a qubit 1 and a qubit 2 is shown in FIG. 12A. Assuming that a polarization state of the qubit 1 is a horizontal polarization ($S_1=1$), when the interaction is an antiferromagnetic coupling, the polarization state of the qubit 2 is lower in energy when the polarization state of the qubit 2 is the vertical polarization ($S_1=-1$). This can also reduce a propagation loss compared to other polarization states. Therefore, the polarization interferometer may generate a gain when the polarization state of the qubit 2 is the vertical polarization.

Again, the polarization state should not be observed by using a photodetector or the like. This is because the quantum state is completely determined according to the wave function collapse. A devise is required so that the maximum gain can be obtained when the state of the qubit 2 is the vertical polarization without such observation. Therefore, only the qubit 2 is rotated 180° around the $S_2$ axis without observing the qubit in advance using the Poincaré rotator. In this way, only the qubit 2 is rotated, and both the qubits are interfered with each other so as to achieve the maximum gain. Since the rotated qubit 2 and the qubit 1 are oriented in the same direction when the maximum gain has been achieved, the maximum gain can be achieved by returning the spin state of the qubit 2 again (rotating −180° around the $S_2$ axis) and returning the components to the non-interacting components of the qubit 2 (direct interaction). Instead of returning to the non-interacting components of the qubit 2, the components may return to the qubit 1 without rotation (exchange interaction) without any problem.

In this operation, even if the qubit 1 is the vertical polarization ($S_1=-1$) and the qubit 2 is the horizontal polarization ($S_1=1$), the maximum gain can be obtained as well. Even in this case, since the qubit 2 rotates 180° around the $S_2$ axis to become the vertical polarization, the maximum gain can be obtained.

The problem of this operation is that when the polarization state of the qubit 1 is a left circular polarization state ($S_3=1$), when the polarization state of the qubit 2 is the right circular polarization state ($S_3 32 -1$), the maximum gain is generated by rotating −180° around the $S_2$ axis. Since the Z-axis polarization interferometer 50 is an interaction for giving the maximum gain to the horizontal polarization ($S_1=1$) and the vertical polarization ($S_1=-1$), which are linear polarization, it is undesirable that a gain occurs for the circular polarization state.

Figure 12B:
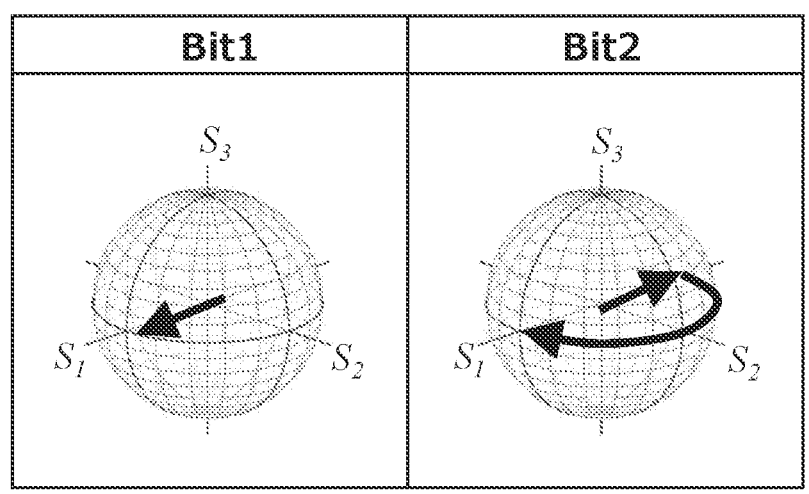
FIG. 12B is a diagram illustrating the principle of the polarization interferometer.

Therefore, the laser light branched from the single-mode optical fiber ring 17 is first branched into two laser lights, and two qubit pairs are prepared in advance. On one pair of the qubit pairs, the above-described operation (first operation, 180° rotation around the $S_2$ axis) is performed. FIG. 12B shows a second operation performed on the other pair of the qubit pairs. As shown in FIG. 12B, only the qubit 2 is rotated 180° around the $S_3$ axis. As a result, when the qubit 1 is the horizontal polarization ($S_1=1$) and the qubit 2 is the vertical polarization ($S_1=1$), the spin has the same orientation after rotation, and the maximum gain is given. On the other hand, in the circular polarization state ($S_3=\pm 1$), the gain does not occur because the circular polarization state is invariant for the rotation around the $S_3$ axis. In the second operation, a gain is also generated for the antiferromagnetic coupling between the D-polarization and the A-polarization, but in this case, the gain does not occur in the first operation. The Z-axis polarization interferometer 50 is configured to generate a maximum gain only when the vertical polarization is paired with the horizontal polarization by the combination of the above two operations.

Figure 10A:
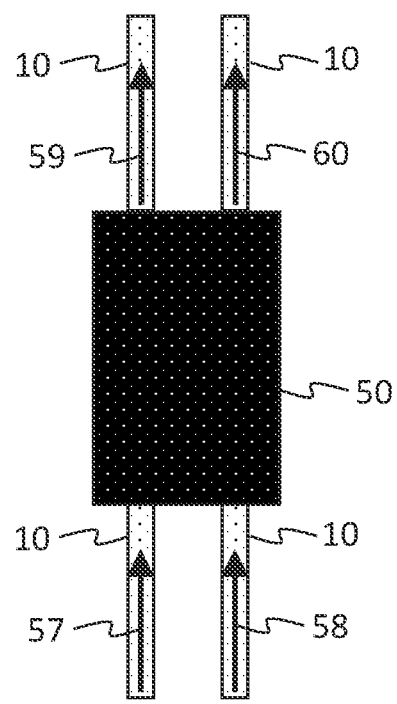
FIG. 10A shows a polarization interferometer for the Z axis.

The Z-axis polarization interferometer 50 is shown in FIG. 10A. FIG. 10A is a simplified schematic diagram, and the polarization state of the qubit input to the Z-axis polarization interferometer 50 is changed in an output state with the input qubit 1 as a laser pulsed light 57, the input qubit 2 as a laser pulsed light 58, the output qubit 1 as a laser pulsed light 59, the output qubit 2 as a laser pulsed light 60. In FIG. 9, a connection with the single-mode optical fiber ring 17 is omitted, but the laser light is branched from the single-mode optical fiber ring 17 by a directional coupler. Assuming that the qubit 1 is an advanced bit, as described above, a delay line 55 for Z-axis input is connected to the single-mode optical fiber 10 that receives the laser pulsed light 57, and the delay line 56 for Z-axis output is connected to the single mode optical fiber 10 outputting the laser pulsed light 60.

Figure 10B:
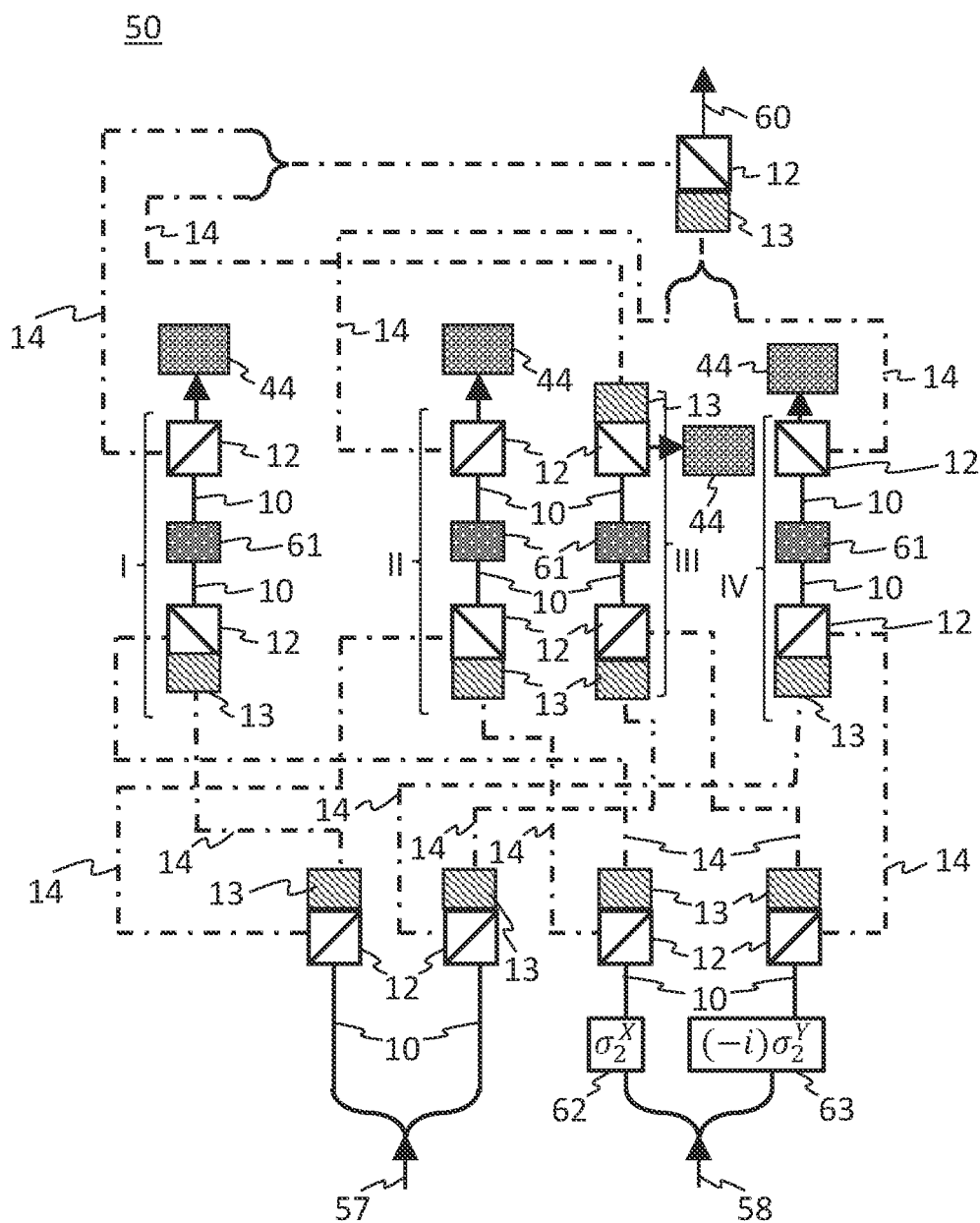
FIG. 10B shows a configuration example of an optical circuit of the polarization interferometer for the Z axis.

FIG. 10B shows a configuration example of the optical circuit of the Z-axis polarization interferometer 50. First, the laser pulsed light 57, which is the input qubit 1, and the laser pulsed light 58, which is the input qubit 2, are branched into two and divided into two qubit pairs. The 180° rotation around the $S_2$ axis (first operation) with respect to the input qubit 2 is realized by a half-wave plate 62 around the X axis, and the 180° rotation around the $S_3$ axis (second operation) with respect to the input qubit 2 is realized by a half-wave rotator 63 around the Y axis. The X-axis half-wave plate 62 and the Y-axis half-wave rotator 63 are realized by applying a predetermined voltage to the Poincaré rotator 9. The qubits are separated into a horizontal polarization component and a vertical polarization component by the polarization beam splitter 12, and input to a phase determination unit. The polarization interferometer has four phase determination units I to IV having equal basic configurations, and the phase determination unit I receives the horizontal polarization component of the qubit 1 and the horizontal polarization component of the qubit 2 subjected to the first operation. The phase determination unit II receives the vertical polarization component of the qubit 1 and the vertical polarization component of the qubit 2 subjected to the first operation. The phase determination unit III receives the horizontal polarization component of the qubit 1 and the horizontal polarization component of the qubit 2 subjected to the second operation. The phase determination unit IV receives the vertical polarization component of the qubit 1 and the vertical polarization component of the qubit 2 subjected to the second operation.

The qubit is propagated to each phase determination unit by the polarization-maintaining and absorption-reducing optical fibers 14. At this time, as in the case of the Poincaré rotator 9 shown in FIG. 4B, the horizontal polarization component is propagated by the half-wave plate 13 after adjusting a slow axis to a narrow key of the polarization-maintaining and absorption-reducing optical fiber 14. In those connections, the length of the polarization-maintaining and absorption-reducing optical fibers 14 is adjusted to be the same, and although omitted in the drawing, a phase modulator may be used as needed.

In each phase determination unit, the polarization components of the two qubits to be input are input to the polarization beam coupler 12 and coupled to the single-mode optical fiber 10. The coupled laser pulsed light is rotated in phase 90° around the Z axis by the Z-axis quarter wave rotator 61, and then input to the polarization beam splitter 12. With the rotation of the coupled laser pulsed light 90° around the Z axis, the circular polarization component or the D-polarization/A-polarization component is set to 0 to determine whether the phase of the wave function of the qubit 1 and qubit 2 is the same. The Z-axis quarter wave rotator 61 can also be realized by applying a predetermined voltage to the Poincaré rotator 9.

The vertical polarization component in which the output of the phase determination unit I and the output of the phase determination unit III for the horizontal polarization component of the quantum bit 1 are coupled with each other is coupled with the horizontal polarization component in which the output of the phase determination unit II and the output of the phase determination unit IV for the vertical polarization component of the qubit 1 are coupled with each other by the polarization beam coupler 12, and output the coupled polarization component as the laser pulsed light 60 to the output qubit 2. At this time, the vertical polarization component of the outputs for the horizontal polarization component of the qubit 1 and the horizontal polarization component of the outputs for the horizontal polarization component of the qubit 1 are coupled with each other to obtain a state in which the polarization components are rotated −180° about the $S_2$ axis or the $S_3$ axis. In this configuration example, since the polarization components are not output to the qubit 1 (the laser pulsed light 59 is not output), the intensity of the components not required for output is monitored with a photodiode 44. It can be confirmed that the output gain to the qubit 2 increases and the propagation loss component observed by the photodiode 44 decreases as the laser light orbits the single-mode optical fiber ring 17. The Z-axis polarization interferometer 50 is not limited to the configuration example of FIG. 10B, and the components are easily output to, for example, the qubit 1.

Figure 11A:
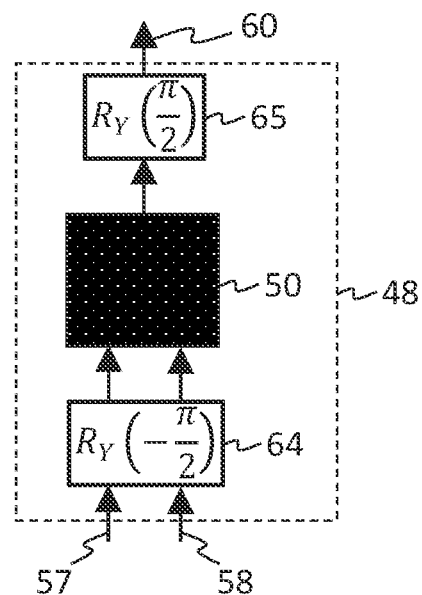
FIG. 11A shows a configuration example of a polarization interferometer for the X axis.
Figure 11B:
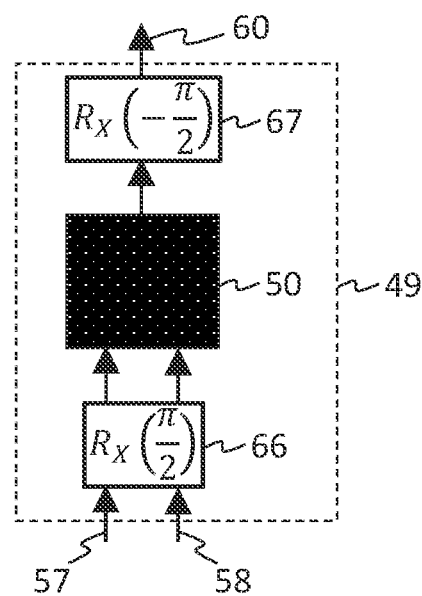
FIG. 11B shows a configuration example of a polarization interferometer for the Y axis.

As with the Z-axis polarization interferometer 50, which performs the Z-axis antiferromagnetic interaction operation shown in FIG. 10B, the X-axis polarization interferometer 48 performing the antiferromagnetic interaction operation in the X-axis direction, and the Y-axis polarization interferometer 49 for performing the antiferromagnetic interaction operation in the Y-axis direction can also be configured. The configurations which realize those polarization interferometers simplest are shown in FIGS. 11A and 11B. FIG. 11A shows a configuration example of the X-axis polarization interferometer 48. The quarter wave reverse rotator 64 around the Y-axis rotates the qubits 1 and 2 −90° around the $S_3$ axis. This operation is nothing more than converting D-polarization to horizontal polarization and A-polarization to vertical polarization. The qubits 1 and 2 that have been subjected to the above operations are subjected to an antiferromagnetic interaction by the Z-axis polarization interferometer 50. The axis of the polarization state of the obtained qubit 2 is returned to an original axis by using a quarter wave rotator 65 around the Y axis. As a result, the X-axis polarization interferometer 48 is realized.

FIG. 11B shows a configuration example of the Y-axis polarization interferometer 49. The qubits 1 and 2 are rotated 90° around the $S_2$ axis by a quarter wave rotator 66 around the X axis. With the above operation, the right circular polarization is converted to horizontal polarization and left circular polarization is converted to vertical polarization, and an antiferromagnetic interaction is performed by the Z-axis polarization interferometer 50. The axis of the obtained polarization state of the qubit 2 polarized state is returned to the original axis by using a quarter wave reverse rotator 67 around the X axis.

In the case of realizing a ferromagnetic interaction, the X-axis half-wave plate 62 and the Y-axis half-wave rotator 63 of the Z-axis polarization interferometer 50 are realized by using the Poincaré rotator 9, and when applying the ferromagnetic interaction, the polarization state is compared as ferromagnetic without rotating, and the Poincaré rotator 9 is installed immediately before the output 60 to the output qubit 2, and the polarization state may be reversed as a half-wave plate.

Figure 13A:
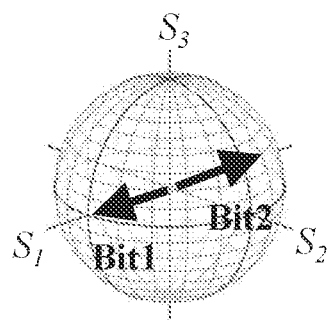
FIG. 13A shows an optimal spin placement example at the time of applying an antiferromagnetic interaction in an $S_1$ axis direction.
Figure 13B:
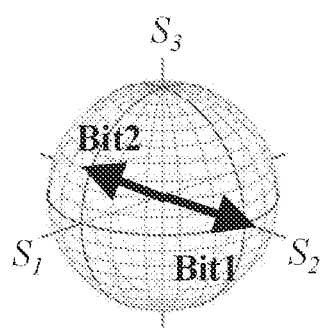
FIG. 13B shows an optimal spin placement example at the time of applying the antiferromagnetic interaction in an $S_2$ axis direction.
Figure 13C:
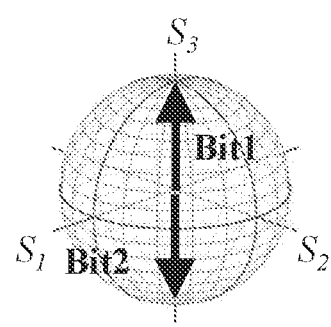
FIG. 13C shows an optimal spin placement example at the time of applying the antiferromagnetic interaction in an $S_3$ axis direction.
Figure 14:
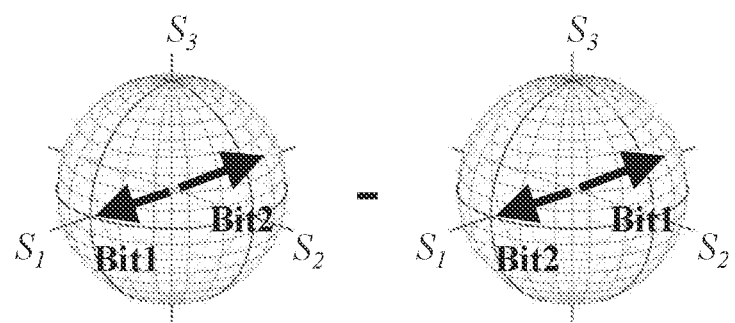
FIG. 14 is a diagram showing a macroscopic quantum entanglement state.

In the Feynman Machine of Example 2, the propagation loss can be minimized by the interaction of the Z-axis polarization interferometer 50 to the Z axis on the $S_1$ axis, thereby providing an antiferromagnetic orientation with linear polarization as shown in FIG. 13A. The interaction by the X-axis polarization interferometer 48 to the X axis is applied to the $S_2$ axis, so that the antiferromagnetic orientation between the D-polarization and the A-polarization becomes advantageous as shown in FIG. 13B. The interaction by the Y-axis polarization interferometer 49 to the Y axis is applied to the $S_3$ axis, so that the antiferromagnetic orientation between the left circular polarization and the right circular polarization becomes advantageous as shown in FIG. 13C. Classically, spin orientation in all these states cannot be optimized. As a result, a macroscopically entangled state as shown in (Ex. 12) or FIG. 14 is realized.

Example 3

The Feynman Machine, based on the space-time warping method of Example 2, is not sensitive to the global phase propagating the ring laser, and can realize the macroscopic quantum entanglement, so that robust operation can be realized for environmental changes such as temperature changes and external distortion. However, since the optical circuit or the optical integrated circuit disclosed in FIG. 10B is complex, there is a problem that the number of components is large and the cost is high. In this example, a structure that effectively represents an equivalent Hamiltonian by using a simpler structure will be described.

A final structure of Example 3 is a Feynman machine shown in FIG. 9. the configuration of the X-axis polarization interferometer 48, the Y-axis polarization interferometer 49, and the Z-axis polarization interferometer 50 are different from those in Example 2.

Figure 15A:
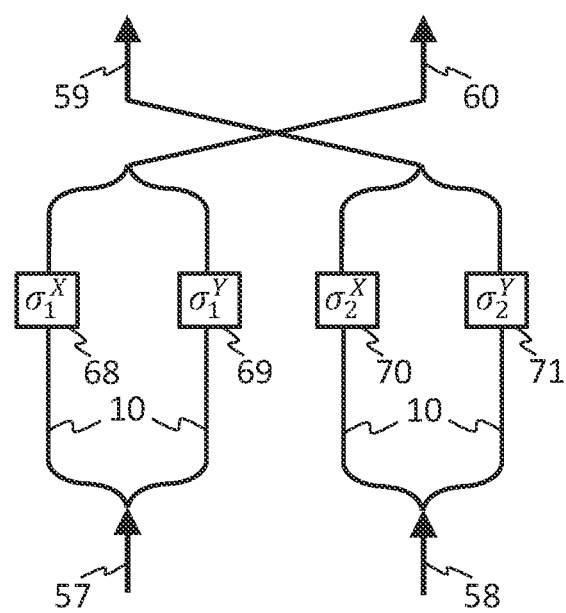
FIG. 15A shows a configuration example of the polarization interferometer for the Z axis of Example 3.

FIG. 15A shows a structure of a Z-axis polarization interferometer 50. Each of a laser pulsed light 57, which is an input qubit 1, and a laser pulsed light 58, which is an input qubit 2, is branched into two. This is because two spin inversion operations are performed. The input qubit 1 is rotated with a half-wave plate 68 around the X axis and a half-wave plate 69 around the Y axis. Those operations convert a horizontal polarization to a vertical polarization and the vertical polarization to the horizontal polarization. The Z-axis polarization interferometer 50 can realize an antiferromagnetic placement in the Z-axis direction as long as the qubit 2 is set to produce an antiferromagnetic gain when the qubit 2 is equal to a state after conversion. For that reason, this purpose can be achieved by coupling a laser pulsed light 60 that is the qubit 1 in which the horizontal polarization is converted into the vertical polarization, and the vertical polarization is converted into the horizontal light as the output qubit 2 with the laser pulsed light (the qubit 2 on the single mode optical fiber ring 17) of the qubit 2. Similarly, in the qubit 2, a laser pulsed light 59 obtained by coupling the laser pulsed light 58, which is the input qubit 2, spin-rotated by a half-wave plate 70 around the X-axis and a half-wave plate 71 around the Y-axis as the output qubit 1 is coupled with the laser pulsed light (the qubit 1 on the single-mode optical fiber ring 17) of the qubit 1 so that antiferromagnetic interactions can be realized.

That is, when the polarization states of the qubit 1 and qubit 2 are a linear polarization state and their orientations are alternate, the photon qubits returned to the ring resonators become coherent and the maximum gain can be obtained. In other polarization states, the gain for laser oscillation cannot be obtained because the light and phase rotating in the ring do not coherently connect each other.

In this example, it is desirable that the half-wave plate is not necessarily a passive optical component but is realized with a Poincaré rotator. If the half-wave plate is the Poincaré rotator, the interaction can be actively changed. For example, a ferromagnetic interaction can be realized by exchanging a part of the light of the qubit 1 and the qubit 2 as it is without performing spin rotation.

Although the description is omitted in FIG. 15A, there is a need to adjust the polarization state and the optical path length in a connection portion of the optical fiber with a polarization regulator 25 or a phase modulator 26 as needed.

Figure 15B:
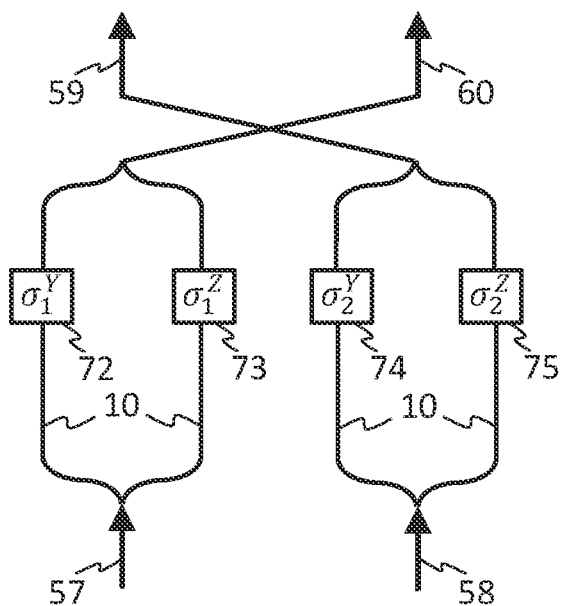
FIG. 15B shows a configuration example of the polarization interferometer for the X axis of Example 3.

FIG. 15B shows a structure of the X-axis polarization interferometer 48. Since the structure of the X-axis polarization interferometer 48 is the same as that of the Z-axis polarization interferometer 50, a repetitive description will be omitted. The qubit 1 is rotated with a half-wave plate 72 around the Y axis and a half-wave plate 73 around the Z axis, and the qubit 2 is rotated with a half-wave plate 74 around the Y axis and a half-wave plate 75 around the Z axis. With those wavelength plates, oblique 45° polarization (D-polarization) is converted to oblique −45° polarization (A-polarization) and A-polarization to D-polarization. When the qubit 1 (qubit 2) thus half-rotating on the Poincaré sphere becomes in a polarization state equal to that of the qubit 2 (qubit 1) before rotation, an antiferromagnetic state in which the polarization, that is, spin, is antiparallel, is realized.

Figure 15C:
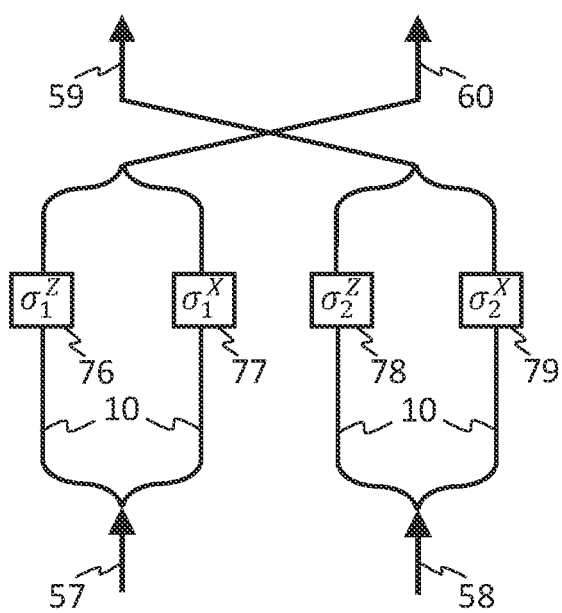
FIG. 15C shows a configuration example of the polarization interferometer for the Y axis of Example 3.

FIG. 15C shows a structure of the Y-axis polarization interferometer 49. Since the structure of the Y-axis polarization interferometer 49 is the same as the structure of the Z-axis polarization interferometer 50, a repetitive description will be omitted. The qubit 1 is rotated with a half-wave plate 76 around the Z axis and a half-wave plate 77 around the X axis, and the qubit 2 is rotated with a half-wave plate 78 around the Z axis and a half-wave plate 79 around the X axis. With those wavelength plates, clockwise circular polarization is converted to counterclockwise circular polarization, and counterclockwise circular polarization is converted to clockwise circular polarization. When the qubit 1 (qubit 2) thus half-rotated on the Poincaré sphere becomes in a polarization state equal to that of the qubit 2 (qubit 1) before rotation, an antiferromagnetic state in which the polarization, that is, spin, is antiparallel, is realized.

Even in the simplified optical circuits shown in FIGS. 15A to 15C described above, a feedback loop is formed between the qubit 1 and the qubit 2, so that the polarization state of each qubit can be quantum correlated without violating causality. Although it is difficult to create a correlation between two qubits that exist spatially apart simply by propagating light in a linear manner in vacuum, the qubit pairs can be brought on the same space-time by using the optical fibers and the optical waveguides as in this example, in which case, through operations such as interference and exchange after spin operation, entanglement can be realized.

Figure 16:
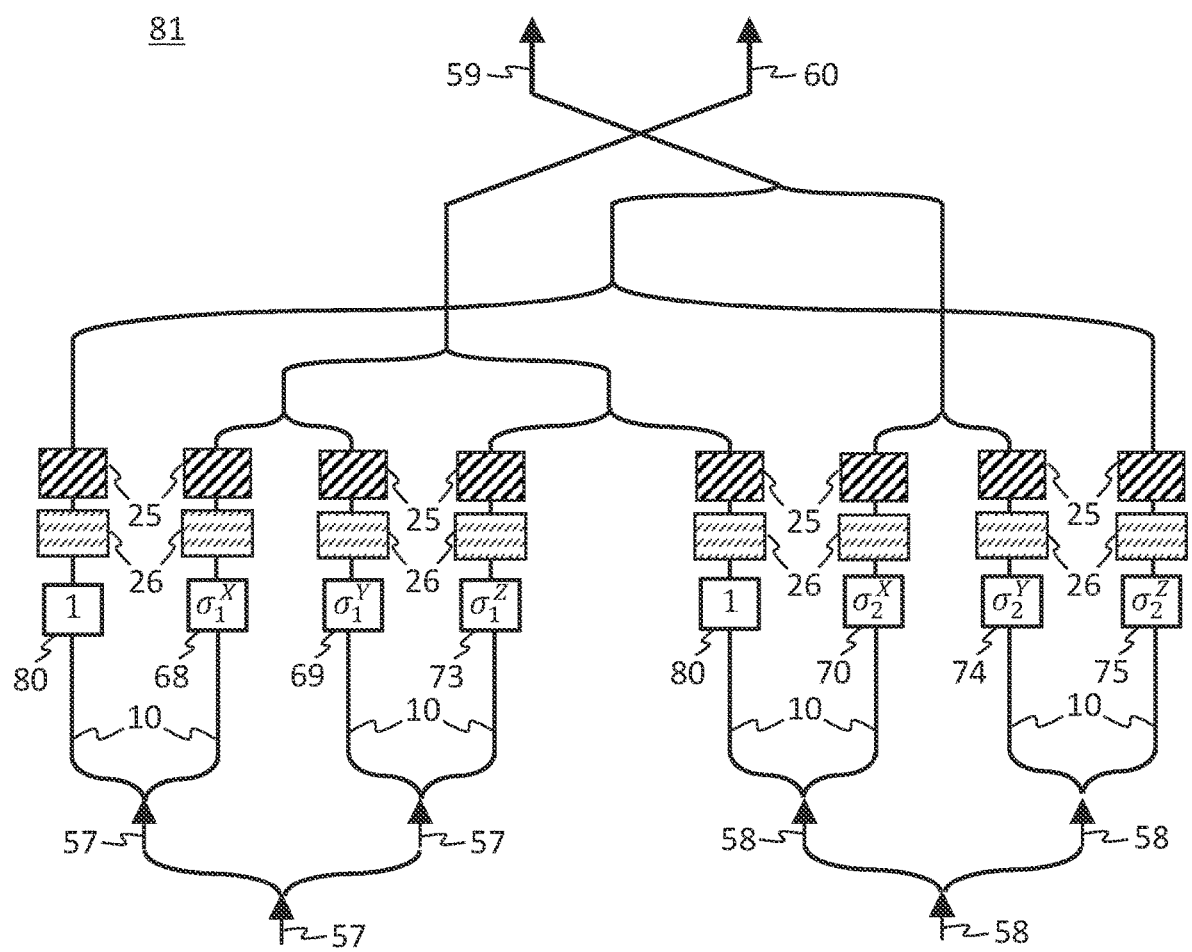
FIG. 16 shows a configuration example of an XYZ axis spin operator.

As a spin operator, when an isotropic ($J_X=J_Y=J_Z=J$) interaction is applied to the X axis, the Y axis, and the Z axis, the configuration can be further simplified. When counting the number of spin operators used in FIGS. 15A to 15C, the spin operators are used twice per axis. On the other hand, FIG. 16 shows a configuration example of an XYZ spin operator 81, in which a rotation operation is performed once for each axis after isotropically dividing, and an interaction similarly to the interaction in FIGS. 15A to 15C is applied. A laser pulsed light 57, which is the input qubit 1, is branched into four, one is intact, and the remaining three are subjected to a half-rotation spin operation around each axis. Similarly, a laser pulsed light 58, which is the input qubit 2, is branched into four, one is intact, and the remaining three are subjected to a half-rotation spin operation around each axis. In this example, the qubits 1 (qubits 2) rotated by a half-wave plate around the X axis and a half-wave plate around the Y axis are coupled with each other as a first coupled laser pulsed light, the qubit 1 (qubit 2) rotated by a half-wave plate around the Z axis and the qubit 2 (qubit 1) are coupled with each other as a second coupled laser pulsed light, and the first coupled laser pulsed light and the second coupled laser pulsed light are coupled with each other to output a laser pulsed light 60 (laser pulsed light 59 that becomes the output qubit 1) which becomes the output qubit 2.

Figure 17:
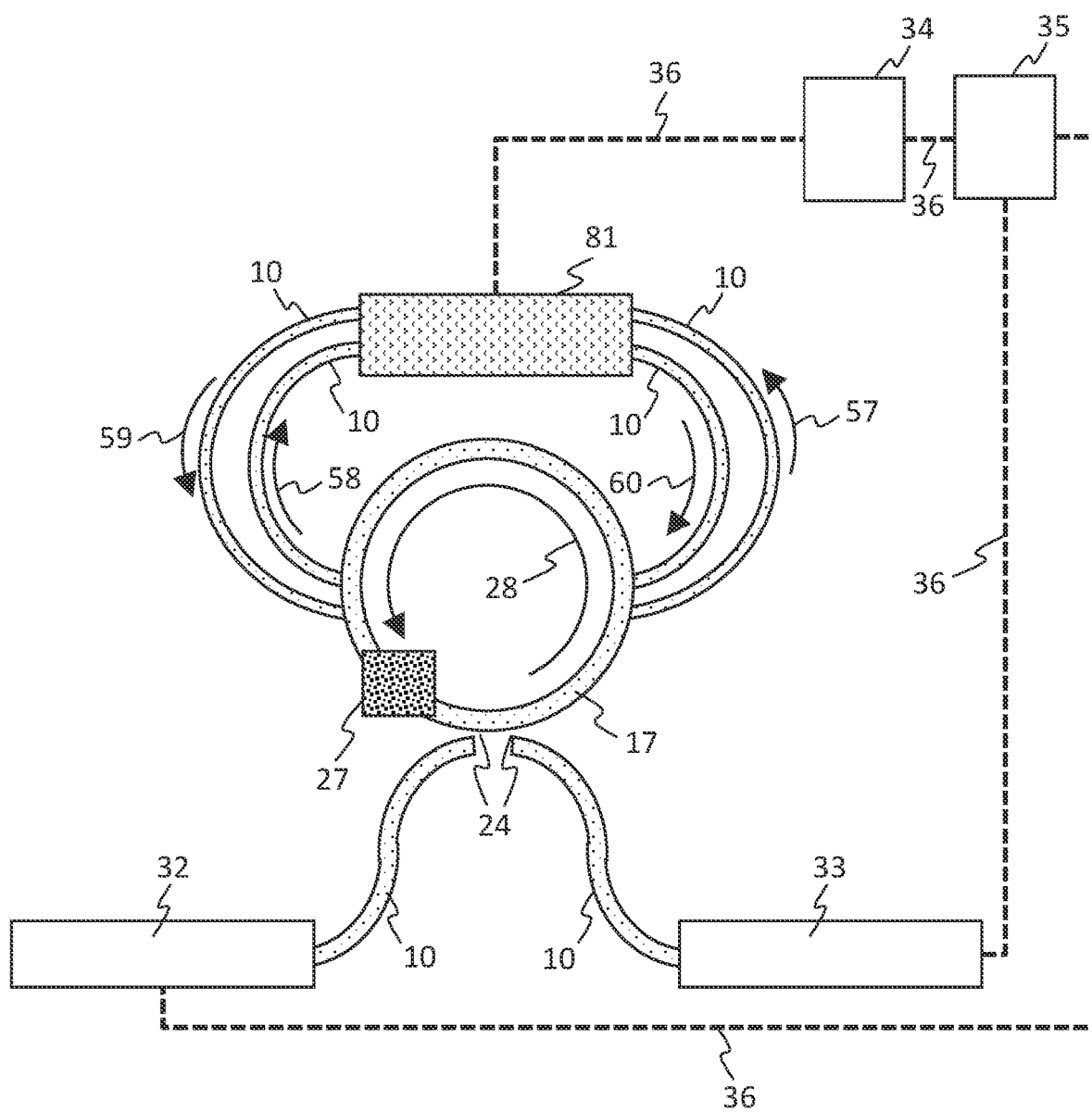
FIG. 17 shows a Feynman Machine of Example 3 using the XYZ axis spin operator.

In this case, the optical path length shown in FIG. 16 may be adjusted exactly to one qubit. This adjustment simplifies the configuration of the Feynman Machine. FIG. 17 shows a configuration example of a Feynman Machine configured by two qubits applying an XYZ spin operator 81 of FIG. 16. As described schematically in the figure, the single-mode optical fiber 10 and the single-mode optical fiber ring 17 are connected to each other by a directional coupler. The optical path length of the single-mode optical fiber ring 17 is set to a length of two qubits, and a position (first position) at which the laser pulsed light 57 that is the qubit 1 is extracted from single-mode optical fiber ring 17 to the XYZ spin operator 81 and a position (second position) at which the laser pulsed light 58 that is the qubit 2 is extracted from the single-mode optical fiber ring 17 to the XYZ spin operator 81 is located with an optical path length for one qubit. Further, a position at which the laser pulsed light 59 as the qubit 1 is coupled from the XYZ spin operator 81 to the single-mode optical fiber ring 17 is located in the vicinity of the second position along the ring resonator propagation direction 28, and a position at which the laser pulsed light 60 as the qubit 2 is coupled from the XYZ spin operator 81 to the single mode optical fiber ring 17 is provided in the vicinity of the first position along the ring resonator propagation direction 28. As a result, the qubit 1 can be coupled to the qubit 2 after extracting the qubit 1 from the single-mode optical fiber ring 17, and the qubit 2 can be coupled to the qubit 1 after extracting the qubit 2. In this way, the configuration can be simplified by setting the optical path length of the XYZ spin operator 81 to one qubit.

In addition, when an interaction between distant qubits rather than an interaction between neighboring qubits is applied, the optical path length is set as follows. First, for the laser pulsed light that becomes the advanced qubit (or delay qubit), the optical path length on the single-mode optical fiber ring 17 from the branch position to the coupled position and the optical path length of the path through the XYZ spin operator 81 are set equally. In addition, on the single-mode optical fiber ring 17, an optical path length according to a delay amount of the laser pulsed light which is the delay qubit with respect to the laser pulsed light which is the advanced qubit in the single mode optical fiber ring 17 is set between the branch position of the laser pulsed light, which is the advanced qubit, and the branch position of the laser pulsed light, which is the delay qubit, and between the coupled position of the laser pulsed light that becomes the advanced qubit and the coupled position of the laser pulsed light that becomes the delay qubit. As a result, as the interaction between the qubits, in addition to the proximity interaction, expansion such as adding a next proximity and other long-distance interactions at the same time can be performed. That is, a desired spin-to-spin interaction between any qubits can be applied.

Example 4

In Example 3, the Feynman Machine, which realizes a macroscopic quantum entanglement state, has been described while compactly reducing the number of components. In this method, a feedback path named the space-time warp method can be inserted into the ring resonator containing a gain medium to realize the quantum correlation between the qubits without violating causality. However, in this method, when an interaction is to be added between qubits far away from a long distance, there is a problem that a path corresponding to the distance must be prepared in advance. In this example, a Feynman Machine, which generates a quantum correlation between arbitrary qubits by using a reincarnation method and realizes a fully coupled state, will be described.

Figure 18:
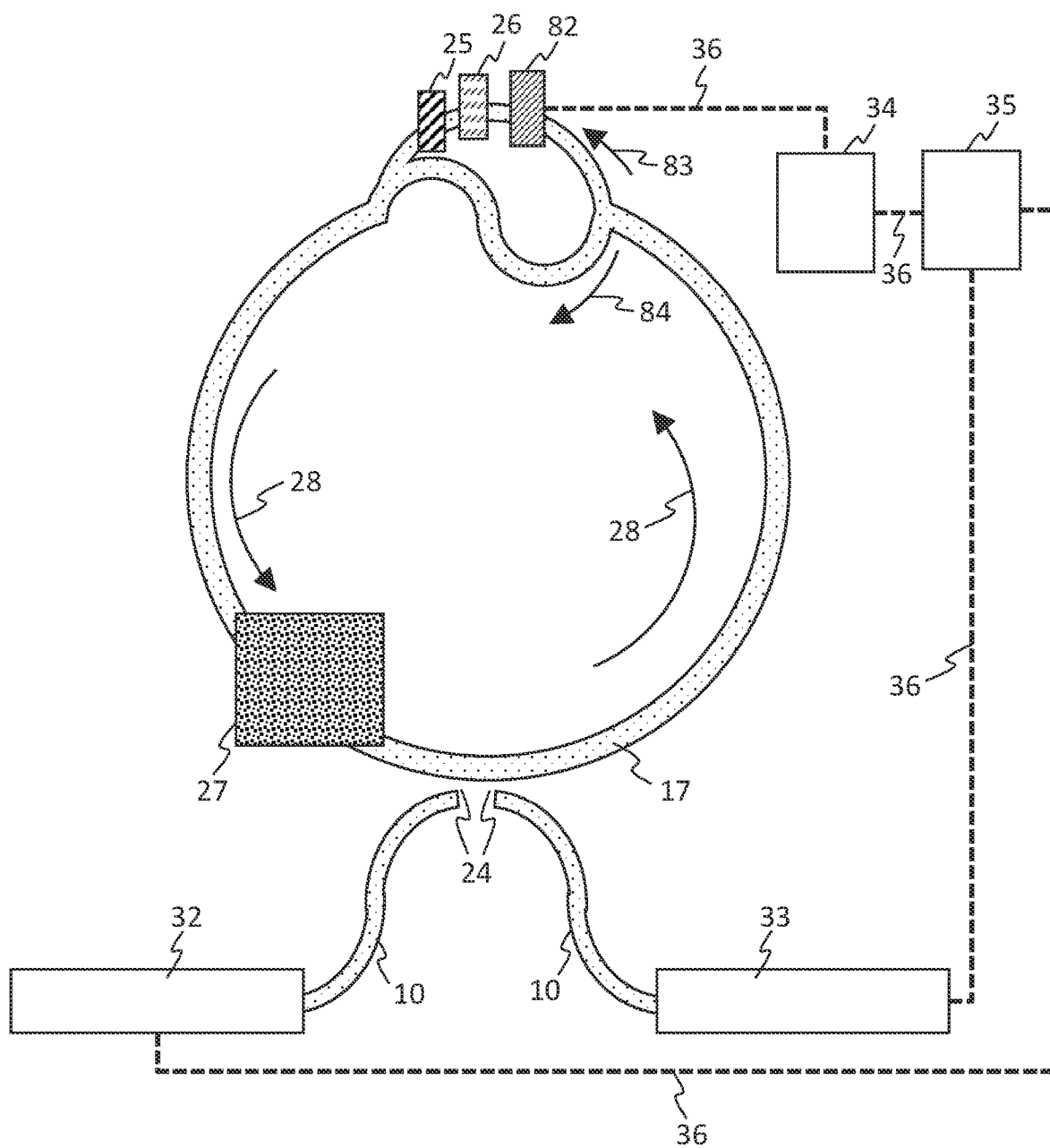
FIG. 18 shows a Feynman Machine of Example 4.

A configuration example of the Feynman Machine in Example 4 is shown in FIG. 18. A single-mode optical fiber ring 17 partially branches into a spin operation path 83 and a ring rotation path 84, and a Poincaré rotator 82 that can be rotated around an arbitrary spin rotation axis is installed in the spin operation path 83. An optical path length of the spin operation path 83 is adjusted to be equal to an optical path length of the ring rotation path 84. In this example, the spin operation path 83 has a circumference of the semicircular circle, and if the radius is R, the optical path length is $\pi R$. The ring rotation path 84 has an optical path length of a half circle having a radius of half (R/2), and the optical path length is also $\pi R$. In practice, since the optical path is formed by using an optical fiber, a silicon thin line waveguide, or the like, the optical path does not necessarily need to be circular, and any shape may be required if the optical path length is adjusted. In this example, since it is difficult to physically adjust the optical path length with an accuracy below the wavelength, a global phase (phase when the qubit orbits the single-mode optical fiber ring 17) is adjusted by a phase modulator 26. Further, in order to align an orientation when the fibers are coupled, the polarization regulator 25 is implemented in the same way as other examples.

In such a structure, in order to interact an $i^{th}$ qubit i and a $j^{th}$ qubit j, when those qubits pass through the spin operation path 83, the Poincaré rotator 82 may be operated, and for other qubits, an identity operation (1) may be performed. For example, when half-rotated in the Z-axis direction, the operation performed in a qubit string is represented by (Ex. 23).

$$(1+h_i\sigma_i^Z)(1-h_j\sigma_j^Z)=1-h_i\sigma_i^Z+h_ih_j\sigma_i^Z\sigma_j^Z \quad \text{Ex. 23}$$

In this case, $h_1$ and $h_j$ are the magnitudes of effective magnetic fields applied to the qubit i and the qubit j, respectively, and are adjusted by a branch ratio. In this case, with $J_{ij}=h_ih_j$, $H_{ij}>0$ represents an antiferromagnetic interaction, and $J_{ij}<0$ represents a ferromagnetic interaction. In this way, changing the sign can be realized only by adjusting the phase with the phase modulator 26.

In this configuration, it is important that the qubits to be interacted with each other are not limited at all. That is, the interactions can be applied between any qubits.

(Ex. 23) has a non-interacting term. For this reason, when such a local magnetic field is not applied, an interaction represented as (Ex. 24) is continuously applied.

$$(1-h_i\sigma_i^Z)(1-h_j\sigma_j^Z)=1-h_i\sigma_i^Z-h_j\sigma_j^Z+h_ih_j\sigma_i^Z\sigma_j^Z \quad \text{Ex. 24}$$

As a result, the interaction represented by (Ex. 25) remains as the overall average, and the local magnetic field can be erased.

$$1+J_{ij}\sigma_i^Z\sigma_j^Z \quad \text{Ex. 25}$$

In this example, since the interactions can be easily applied between the arbitrary qubits, a large number of the qubits can be complexly interacted with each other.

As described above, in the quantum state, based on the Feynman's idea of the path integration, which is assumed to be a combination of probability amplitudes of all feasible paths, such paths are realized as the paths of the laser light by using a polarization controller that can rotate the spin (polarization state of laser light) of freely macroscopic photons, the ring laser contained in the laser light path is oscillated to physically realize the XYZ quantum Heisenberg model, which is a quantum multi-body problem, and the solution can be obtained as a polarization state of laser light, which has been described with reference to the multiple examples.

In the present invention, a quantum bit configured by a plurality of photons is targeted, but the qubit may be a single photon. For a single photon, a desired quantum state can be realized by performing a spin operation according to the present invention.

REFERENCE SIGNS LIST

1 . . . green function, 2, 3, 5, 6, 7, 8 . . . operation, 4 . . . interaction, 9 . . . Poincaré rotator, 10 . . . single mode optical fiber, 11 . . . photo qubit, 12 . . . polarization beam splitter (polarization beam coupler), 13 . . . half-wave plate, 14 . . . polarization-maintaining and absorption-reducing optical fiber, 15 . . . optical rotator, 16 . . . optical modulator array, 17 . . . single-mode optical fiber optic ring, 18 . . . optical fiber for applying X-axis interaction, 19 . . . optical fiber for applying Y-axis interaction, 20 . . . optical fiber for applying Z-axis interaction, 21 . . . Poincaré rotator for applying X-axis interaction, 22 . . . Poincaré rotator for applying Y-axis interaction, 23 . . . Poincaré rotator for applying Z-axis interaction, 24 . . . directional coupler, 25 . . . polarization regulator, 26 . . . phase modulator, 27 . . . erbium doped optical amplifier, 28 . . . ring resonator propagation direction, 29 . . . optical fiber propagation direction for X-axis, 30 . . . optical fiber propagation direction for Y-axis, 31 . . . optical fiber propagation direction for Z-axis, 32 . . . incident laser light control unit, 33 . . . laser light detection unit, 34 . . . waveform generator, 35 . . . control computer, 36 . . . electrical cable, 37 . . . driver circuit, 38 . . . optical modulator, 39 . . . laser light source, 40 . . . X-axis polarization plate, 41 . . . Y-axis polarization plate, 42 . . . D-axis (diagonal 45°) polarization plate, 43 . . . quarter wave plate, 44 . . . photodiode, 45 . . . transformer impedance amplifier, 46 . . . Poincaré rotator for detector, 47 . . . delay line, 48 . . . polarization interferometer for X-axis, 49 . . . polarization interferometer for Y-axis, 50 . . . polarization interferometer for Z-axis, 51 . . . delay line for X-axis input, 52 . . . delay line for X-axis output, 53 . . . delay line for Y-axis input, 54 . . . delay line for Y-axis output, 55 . . . delay line for Z-axis input, 56 . . . delay line for Z-axis output, 57 . . . laser pulsed light (input qubit 1), 58 . . . laser pulsed light (input qubit 2), 59 . . . laser pulsed light (output qubit 1), 60 . . . laser pulsed light (output qubit 2), 61 . . . quarter wave rotator around Z axis, 62 . . . half-wave plate around X axis, 63 . . . half-wave rotator around Y axis, 64 . . . quarter wave reverse rotator around Y axis, 65 . . . quarter wave rotator around Y axis, 66 . . . quarter wave rotator around X axis, 67 . . . quarter wave reverse rotator around X axis, 68 . . . half-wave plate around X axis, 69 . . . half-wave plate around Y axis, 70 . . . half-wave plate around X axis, 71 . . . half-wave plate around Y axis, 72 . . . half-wave plate around Y axis, 73 . . . half-wave plate around Z axis, 74 . . . half-wave plate around Y axis, 75 . . . half-wave plate around Z axis, 76 . . . half-wave plate around Z axis, 77 . . . half-wave plate around X axis, 78 . . . half-wave plate around Z axis, 79 . . . half-wave plate around X axis, 80 . . . identity operator, 81 . . . XYZ spin operator, 82 . . . Poincaré rotator, 83 . . . spin operation path, 84 . . . ring rotation path, 101, 102, 103, 104 . . . state.

What is claimed is:

1. A laser oscillator comprising:
   a ring resonator including an optical fiber ring in which an optical fiber is connected in a ring shape;
   an incident laser light control unit that enters a laser pulsed light as a qubit string on the ring resonator;
   a laser light detection unit that detects a polarization state of the laser pulsed light oscillating by the ring resonator;
   an optical amplifier that is connected to the optical fiber ring and maintains an amplitude of the laser pulsed light propagating through the optical fiber ring;
   a first optical fiber that is connected with a first polarization controller, after changing a polarization state of the laser pulsed light being a first qubit and a second qubit, which are continuous to each other and extracted from the optical fiber ring at a predetermined branch ratio, by the first polarization controller, and couples the laser pulsed light whose polarization state has been changed with the laser pulsed light being the first qubit and the second qubit, which are continuous to each other and propagate on the optical fiber ring;
   a second optical fiber that is connected with a second polarization controller, after changing a polarization state of the laser pulsed light being the first qubit and the second qubit, which are continuous to each other and extracted from the optical fiber ring at a predetermined branch ratio, by the second polarization controller, and couples the laser pulsed light whose polarization state has been changed with the laser pulsed light being the first qubit and the second qubit, which are continuous to each other and propagate on the optical fiber ring; and
   a third optical fiber that is connected with a third polarization controller, after changing a polarization state of the laser pulsed light being the first qubit and the second qubit, which are continuous to each other and extracted from the optical fiber ring at a predetermined branch ratio, by the third polarization controller, and couples the laser pulsed light whose polarization state has been changed with the laser pulsed light being the first qubit and the second qubit, which are continuous to each other and propagate on the optical fiber ring,
   wherein the polarization state of the laser pulsed light is represented as a state vector in a Poincaré sphere having an $S_1$ axis, an $S_2$ axis, and an $S_3$ axis which are orthogonal to each other, the first polarization controller rotates the state vector representing the polarization state of the laser pulsed light as a rotation axis on the $S_1$ axis, the second polarization controller rotates the state vector representing the polarization state of the laser pulsed light as a rotation axis on the $S_2$ axis, and the third polarization controller rotates the state vector representing the polarization state of the laser pulsed light as a rotation axis on the $S_3$ axis.

2. The laser oscillator according to claim 1,
   wherein the polarization state of the laser pulsed light is represented as a state vector having a base with the $S_1$ axis as the Z axis, the $S_2$ axis as the X axis, and the $S_3$ axis as the Y axis,
   each of the first to third polarization controllers includes:
   a polarization beam splitter that separates a laser pulse as the qubit into a horizontal polarization component and a vertical polarization component;
   an optical rotator that adjusts an amplitude ratio between the horizontal polarization component and the vertical polarization component;
   an optical modulator array that gives a phase difference between the horizontal polarization component and the vertical polarization component, which are adjusted by the optical rotator; and
   a polarization beam coupler that couples the horizontal polarization component with the vertical polarization component, which are given the phase difference by the optical modulator array.

3. The laser oscillator according to claim 1, wherein the incident laser light control unit makes a laser pulsed light having a small portion of amplitude formed between the qubits incident into the ring resonator as a laser pulsed light being the qubit string.

4. The laser oscillator according to claim 1,
   wherein the polarization state of the laser pulsed light is represented as a state vector having a base with the $S_1$ axis as the Z axis, the $S_2$ axis as the X axis, and the $S_3$ axis as the Y axis,
   the laser light detection unit includes a fourth polarization controller and a delay line, and
   the fourth polarization controller changes the polarization state of one of the laser pulsed light being the first qubit and the laser pulsed light being the second qubit, which are oscillated by the ring oscillator, and then detects the other polarization state of the laser pulsed light being the first qubit and the laser pulsed light being the second qubit.

5. A laser oscillator comprising:
   a ring resonator that includes an optical fiber ring in which the optical fiber is coupled in a ring shape and partially branched into a first path and a second path having equal optical path lengths;
   an incident laser light control unit that enters a laser pulsed light as a qubit string on the ring resonator;
   a laser light detection unit that detects a polarization state of the laser pulsed light oscillating by the ring resonator;
   an optical amplifier that is connected to the optical fiber ring and maintains an amplitude of the laser pulsed light propagating through the optical fiber ring; and
   a polarization controller that is connected to the first path of the optical fiber ring,
   wherein the laser pulsed light that becomes the qubit string passing through the first path is coupled with the laser pulse that becomes the qubit string that has passed through the second path without receiving the control of the polarization state, after changing the polarization states of the laser pulsed light being an $i^{th}$ qubit and the laser pulsed light being a $j^{th}$ qubit by the polarization controller, and
   the polarization state of the laser pulsed light is represented as a state vector in a Poincaré sphere having an $S_1$ axis, an $S_2$ axis, and an $S_3$ axis, which are orthogonal to each other, and the polarization controller rotates the state vector representing the polarization state of the laser pulsed light around one of the $S_1$ axis, the $S_2$ axis, and the $S_3$ axis as a rotation axis.

6. The laser oscillator according to claim 5,
   wherein the polarization controller is controlled by a control computer,
   the polarization controller oscillates the ring resonator while rotating the polarization states of the laser pulsed light being the $i^{th}$ qubit and the laser pulsed light being the $j^{th}$ qubit with a first rotational amount around one of the $S_1$ axis, the $S_2$ axis, and the $S_3$ axis as the rotation axis, and then oscillates the ring resonator while rotating in a reverse direction the polarization states of the laser pulsed light being the $i^{th}$ qubit and the laser pulsed light being the $j^{th}$ qubit with the first rotational amount around the rotation axis.

7. A laser oscillator comprising:

a ring resonator including an optical fiber ring in which an optical fiber is connected in a ring shape;

an incident laser light control unit that enters a laser pulsed light as a qubit string on the ring resonator;

a laser light detection unit that detects a polarization state of the laser pulsed light oscillating by the ring resonator;

an optical amplifier that is connected to the optical fiber ring and maintains an amplitude of the laser pulsed light propagating through the optical fiber ring;

a first polarization interferometer that outputs the laser pulsed light being the first qubit or the laser pulsed light being the second qubit according to the polarization state of the laser pulsed light being a first qubit and the polarization state of the laser pulsed light being a second qubit, which are extracted from the optical fiber ring at a predetermined branch ratio, and couples the output laser pulsed light with the laser pulsed light propagating on the optical fiber ring;

a second polarization interferometer that outputs the laser pulsed light being the first qubit or the laser pulsed light being the second qubit according to the polarization state of the laser pulsed light being the first qubit and the polarization state of the laser pulsed light being the second qubit, which are extracted from the optical fiber ring at a predetermined branch ratio, and couples the output laser pulsed light with the laser pulsed light propagating on the optical fiber ring;

a third polarization interferometer that outputs the laser pulsed light being the first qubit or the laser pulsed light being the second qubit according to the polarization state of the laser pulsed light being the first qubit and the polarization state of the laser pulsed light being the second qubit, which are extracted from the optical fiber ring at a predetermined branch ratio, and couples the output laser pulsed light with the laser pulsed light propagating on the optical fiber ring;

a first input delay line that delays the laser pulsed light being the first qubit according to a delay amount of the laser pulsed light being the second qubit with respect to the laser pulsed light being the first qubit in the optical fiber ring, and inputs the delayed laser pulsed light to the first polarization interferometer;

a first output delay line that delays the laser pulsed light being the second qubit output from the first polarization interferometer according to the delay amount of the laser pulsed light being the second qubit with respect to the laser pulsed light being the first qubit in the optical fiber ring;

a second input delay line that delays the laser pulsed light being the first qubit according to a delay amount of the laser pulsed light being the second qubit with respect to the laser pulsed light being the first qubit in the optical fiber ring, and inputs the delayed laser pulsed light to the second polarization interferometer;

a second output delay line that delays the laser pulsed light being the second qubit output from the second polarization interferometer according to the delay amount of the laser pulsed light being the second qubit with respect to the laser pulsed light being the first qubit in the optical fiber ring;

a third input delay line that delays the laser pulsed light being the first qubit according to a delay amount of the laser pulsed light being the second qubit with respect to the laser pulsed light being the first qubit in the optical fiber ring, and inputs the delayed laser pulsed light to the third polarization interferometer; and a third output delay line that delays the laser pulsed light being the second qubit output from the third polarization interferometer according to the delay amount of the laser pulsed light being the second qubit with respect to the laser pulsed light being the first qubit in the optical fiber ring, wherein the polarization state of the laser pulsed light is represented as a state vector in a Poincaré sphere having an $S_1$ axis, an $S_2$ axis, and an $S_3$ axis, which are orthogonal to each other, the first polarization interferometer maximizes a gain when a Stokes parameter $S_1$ of the first qubit is 1 and the Stokes parameter $S_1$ of the second qubit is −1, or when the Stokes parameter $S_1$ of the first qubit is −1 and the Stokes parameter $S_1$ of the second qubit is 1, the second polarization interferometer maximizes the gain when a Stokes parameter $S_2$ of the first qubit is 1 and the Stokes parameter $S_2$ of the second qubit is −1, or when the Stokes parameter $S_2$ of the first qubit is −1 and the Stokes parameter $S_2$ of the second qubit is 1, and the third polarization interferometer maximizes the gain when a Stokes parameter $S_3$ of the first qubit is 1 and the Stokes parameter $S_3$ of the second qubit is −1, or when the Stokes parameter $S_3$ of the first qubit is −1 and the Stokes parameter $S_3$ of the second qubit is 1.

8. The laser oscillator according to claim 7, wherein the polarization state of the laser pulsed light is represented as a state vector having a base with the $S_1$ axis as the Z axis, the $S_2$ axis as the X axis, and the $S_3$ axis as the Y axis, and the first polarization interferometer maximizes the gain both when the laser pulsed light being the first qubit interferes with the laser pulsed light being the second qubit rotated 180° around the $S_2$ axis, and when the laser pulsed light being the first qubit interferes with the laser pulsed light being the second qubit rotated 180° around the $S_3$ axis.

9. The laser oscillator according to claim 8, wherein the second polarization interferometer includes:

a second of the first polarization interferometer;

a quarter wave reverse rotator around the Y axis which rotates the polarization states of the laser pulsed light being the first qubit and the laser pulsed light being the second qubit −90° around the $S_3$ axis, and inputs the rotated laser pulsed lights to the second first polarization interferometer; and a quarter wave rotator around the Y axis which rotates the polarization state of the output of the second first polarization interferometer 90° around the $S_3$ axis.

10. The laser oscillator according to claim 8, wherein the third polarization interferometer includes:

a third of the first polarization interferometer;

a quarter wave rotator around the X axis which rotates the polarization states of the laser pulsed light being the first qubit and the laser pulsed light being the second qubit 90° around the $S_2$ axis, and inputs the rotated laser pulsed lights to the third first polarization interferometer; and a quarter wave reverse rotator around the X axis which rotates the polarization state of the output of the third first polarization interferometer −90° around the $S_2$ axis.

11. The laser oscillator according to claim 7,
wherein the polarization state of the laser pulsed light is represented as a state vector having a base with the $S_1$ axis as the Z axis, the $S_2$ axis as the X axis, and the $S_3$ axis as the Y axis,
the first polarization interferometer includes:
a first X-axis half-wave plate that rotates the polarization state of the laser pulsed light being the first qubit 180° around the $S_2$ axis;
a first Y-axis half-wave plate that rotates the polarization state of the laser pulsed light being the first qubit 180° around the $S_3$ axis;
a second X-axis half-wave plate that rotates the polarization state of the laser pulsed light being the second qubit 180° around the $S_2$ axis; and
a second Y-axis half-wave plate that rotates the polarization state of the laser pulsed light being the second qubit 180° around the $S_3$ axis,
wherein the first polarization interferometer couples the laser pulsed light being the first qubit passing through the first X axis half-wave plate with the laser pulsed light being the first qubit passing through the first Y axis half-wave plate, and outputs the coupled laser pulsed light as the laser pulsed light being the second qubit, and
the second polarization interferometer couples the laser pulsed light being the second qubit passing through the second X axis half-wave plate with the laser pulsed light being the second qubit passing through the second Y axis half-wave plate, and outputs the coupled laser pulsed light as the laser pulsed light being the first qubit.

12. The laser oscillator according to claim 11,
wherein the second polarization interferometer includes:
a third Y-axis half-wave plate that rotates the polarization state of the laser pulsed light being the first qubit 180° around the $S_3$ axis;
a first Z-axis half-wave plate that rotates the polarization state of the laser pulsed light being the first qubit 180° around the $S_1$ axis;
a fourth Y-axis half-wave plate that rotates the polarization state of the laser pulsed light being the second qubit 180° around the $S_3$ axis; and
a second Z-axis half-wave plate that rotates the polarization state of the laser pulsed light being the second qubit 180° around the $S_1$ axis,
wherein the second polarization interferometer couples the laser pulsed light being the first qubit passing through the third Y axis half-wave plate with the laser pulsed light being the first qubit passing through the first Z axis half-wave plate, and outputs the coupled laser pulsed light as the laser pulsed light being the second qubit, and
the second polarization interferometer couples the laser pulsed light being the second qubit passing through the fourth Y axis half-wave plate with the laser pulsed light being the second qubit passing through the second Z axis half-wave plate, and outputs the coupled laser pulsed light as the laser pulsed light being the first qubit.

13. The laser oscillator according to claim 11, wherein the third polarization interferometer includes:

a third Z-axis half-wave plate that rotates the polarization state of the laser pulsed light being the first qubit 180° around the $S_1$ axis;
a third X-axis half-wave plate that rotates the polarization state of the laser pulsed light being the first qubit 180° around the $S_2$ axis;
a fourth Z-axis half-wave plate that rotates the polarization state of the laser pulsed light being the second qubit 180° around the $S_1$ axis; and
a fourth X-axis half-wave plate that rotates the polarization state of the laser pulsed light being the second qubit 180° around the $S_2$ axis,
wherein the third polarization interferometer couples the laser pulsed light being the first qubit passing through the third Z axis half-wave plate with the laser pulsed light being the first qubit passing through the third X axis half-wave plate, and outputs the coupled laser pulsed light as the laser pulsed light being the second qubit, and
the third polarization interferometer couples the laser pulsed light being the second qubit passing through the fourth Z axis half-wave plate with the laser pulsed light being the second qubit passing through the fourth X axis half-wave plate, and outputs the coupled laser pulsed light as the laser pulsed light being the first qubit.

14. A laser oscillator comprising:
a ring resonator including an optical fiber ring in which an optical fiber is connected in a ring shape;
an incident laser light control unit that enters a laser pulsed light as a qubit string on the ring resonator;
a laser light detection unit that detects a polarization state of the laser pulsed light oscillating by the ring resonator;
an optical amplifier that is connected to the optical fiber ring and maintains an amplitude of the laser pulsed light propagating through the optical fiber ring; and
an XYZ spin operator that outputs the laser pulsed light being the first qubit and the laser pulsed light being the second qubit according to the polarization state of the laser pulsed light being the first qubit and the polarization state of the laser pulsed light being the second qubit, which are extracted from the optical fiber ring at a predetermined ratio, and couples the output laser pulsed lights with the laser pulsed light being the first qubit and the laser pulsed light being the second qubit, which propagate on the optical fiber ring,
wherein an optical path length on the optical fiber ring from a branch position to a coupling position is equal to an optical path length of a path through the XYZ spin operator for the laser pulsed light being the first qubit and the laser pulsed light being the second qubit, and an optical path length corresponding to a delay amount of the laser pulsed light being the second qubit with respect to the laser pulsed light being the first qubit is provided between the branch position of the laser pulsed light being the first qubit and the branch position of the laser pulsed light being the second qubit, and between the coupling position of the laser pulsed light being the first qubit and the coupling position of the laser pulsed light being the second qubit, on the optical fiber ring,
the polarization state of the laser pulsed light is represented as a state vector in a Poincaré sphere having an $S_1$ axis, an $S_2$ axis, and an $S_3$ axis, which are orthogonal to each other, and the XYZ spin operator maximizes a gain when the stokes parameters $S_1$, $S_2$, and $S_3$ of the first qubit are 1 and the stokes parameters $S_1$, $S_2$, and $S_3$ of the second qubit are −1, or when the stokes parameters $S_1$, $S_2$, and $S_3$ of the first qubit are −1 and the stokes parameters $S_1$, $S_2$, and $S_3$ of the second qubit are 1.

* * * * *